(12) United States Patent
Lasser

(10) Patent No.: US 8,386,868 B2
(45) Date of Patent: Feb. 26, 2013

(54) USING PROGRAMMING-TIME INFORMATION TO SUPPORT ERROR CORRECTION

(75) Inventor: Menahem Lasser, Kochav Yair (IL)

(73) Assignee: SanDisk IL, Ltd., Kfar Saba (IL)

( * ) Notice: Subject to any disclaimer, the term of this patent is extended or adjusted under 35 U.S.C. 154(b) by 1351 days.

(21) Appl. No.: 12/103,784

(22) Filed: Apr. 16, 2008

(65) Prior Publication Data

US 2009/0265598 A1 Oct. 22, 2009

(51) Int. Cl.
*G06F 11/30* (2006.01)

(52) U.S. Cl. ........ 714/746; 714/718; 714/719; 714/758; 714/763; 713/187

(58) Field of Classification Search ............... 714/763, 714/752, 718, 719; 713/187
See application file for complete search history.

(56) References Cited

U.S. PATENT DOCUMENTS

| | | | | |
|---|---|---|---|---|
| 6,553,536 | B1 * | 4/2003 | Hassner et al. | 714/780 |
| 6,751,766 | B2 | 6/2004 | Guterman et al. | |
| 7,992,009 | B2 * | 8/2011 | Seo | 713/187 |
| 2003/0037299 | A1 | 2/2003 | Smith | 714/763 |
| 2003/0217323 | A1 * | 11/2003 | Guterman et al. | 714/763 |
| 2004/0015771 | A1 * | 1/2004 | Lasser et al. | 714/763 |
| 2004/0030737 | A1 * | 2/2004 | Hassner et al. | 708/530 |
| 2004/0117562 | A1 * | 6/2004 | Wu et al. | 711/147 |
| 2005/0172179 | A1 * | 8/2005 | Brandenberger et al. | 714/718 |
| 2005/0185476 | A1 * | 8/2005 | Tachikawa | 365/189.05 |
| 2007/0283227 | A1 * | 12/2007 | Sharon et al. | 714/776 |
| 2008/0086677 | A1 | 4/2008 | Yang et al. | 714/763 |
| 2009/0265598 | A1 * | 10/2009 | Lasser | 714/746 |
| 2009/0319843 | A1 * | 12/2009 | Meir et al. | 714/746 |
| 2009/0319859 | A1 * | 12/2009 | Alrod et al. | 714/752 |
| 2010/0115376 | A1 * | 5/2010 | Shalvi et al. | 714/763 |

FOREIGN PATENT DOCUMENTS

| | | |
|---|---|---|
| WO | WO 2006/013529 A1 | 9/2006 |
| WO | WO2007132457 | 11/2007 |
| WO | WO2008053472 | 5/2008 |
| WO | WO2008068747 | 6/2008 |

* cited by examiner

*Primary Examiner* — Scott Baderman
*Assistant Examiner* — Jeison C Arcos
(74) *Attorney, Agent, or Firm* — Martine Penilla Group, LLP

(57) ABSTRACT

Methods, apparatus and computer readable medium for handling error correction in a memory are disclosed. In some embodiments, first data is written to the memory, and a value (s) of an operational parameter(s) that is a consequence of the writing of the first data is determined. Second data is read from the memory, and the value(s) of the operational parameter(s) may be used when correcting errors in the second data. In some embodiments, the first data is the same as the second data. The presently-disclosed teachings are applicable to any kind of memory including (i) non-volatile memories such as flash memory, magnetic memory and optical storage and (ii) volatile memory such as SRAM or DRAM.

29 Claims, 25 Drawing Sheets

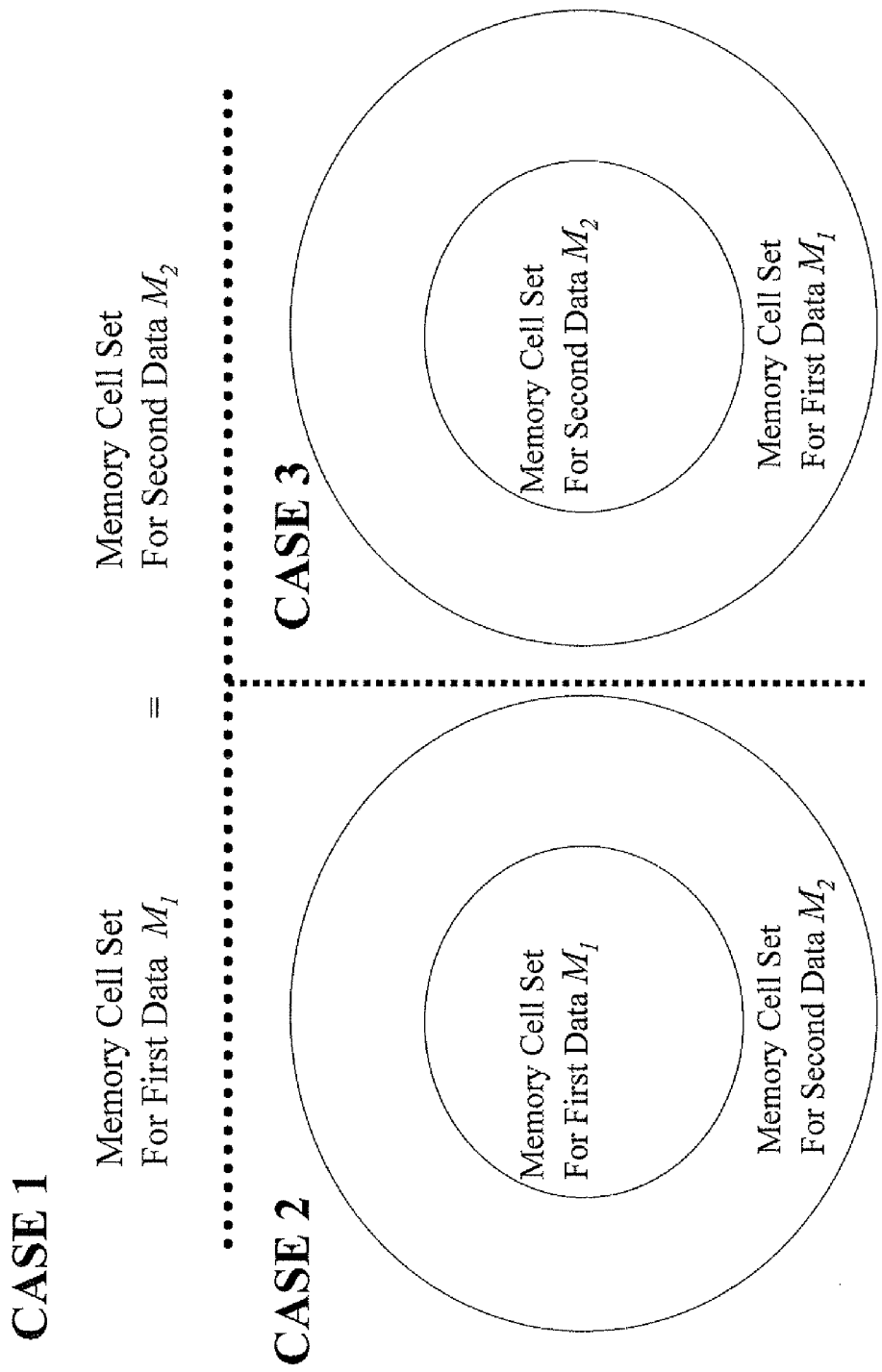

USING PROGRAMMING-TIME INFORMATION TO SUPPORT ERROR CORRECTION

FIELD OF THE INVENTION

The present invention relates to apparatus, methods, and computer medium for correcting errors in data read from a memory such as a flash memory.

BACKGROUND AND RELATED ART

Error Correction in Flash Memory Devices

Flash memory devices have been known for many years. NAND-type flash memories differ from other types of flash memories (e.g. NOR-type), among other characteristics, by the fact that a certain number of information bits, written to the memory, may be read from the memory in a "flipped" state (i.e. different from the state that the original bits were written to the memory).

In order to overcome this phenomenon and to make NAND-type memories usable by real applications, it is a common technique to use Error Correction Codes (ECC) in conjunction with these memories.

There is an ongoing need for improved techniques and apparatus for handling error correction in flash memory devices, and in storage devices that include memory other than flash memory.

A Discussion of Device Architecture

FIG. 1A (prior art) is a block diagram of a flash memory storage device 260 (prior art). The flash memory storage device includes a flash memory 270 and a flash controller 280 operative to read data and to write data to the flash memory 270. The terms "program", "programming", "programmed", and "programmable" are used herein interchangeably with the terms "write", "writing", "written", and "writable", respectively, to denote the storing of data in a flash memory.

One example of a flash memory storage device is a "peripheral flash storage device." Peripheral flash storage devices are well-known in the art of computing, in form factors such as USB flash drives (UFD); PC-cards; and small storage cards used with digital cameras, music players, handheld and palm-top computers, and cellular telephones.

FIG. 1B (prior art) is a block diagram of a peripheral flash memory storage device 260* (the asterisk indicates that the flash memory storage device is a peripheral flash storage device) that is "coupled with" or configured to exchange data with a host device 310 (for example, a laptop or desktop or handheld computers, digital camera, mobile telephone, music player, and video game consoles) via device-side interface 250. Peripheral flash memory storage device 260* and host device 310 communicate with each other via communications link 300 using host-side interface 350 and device-side interface 250 (for example, respective USB or SD interfaces).

In one example, flash memory storage device 260* provides data-reading and data-writing services to host device 310. Data received by flash memory storage device 260* from host device 310 is written to flash memory 270 by flash controller 280. Furthermore, in response to "data read" requests received by flash memory storage, flash controller 280 reads data from flash memory 270.

Errors may be corrected in the read data at "read time" or at any later time. The error-correction may be carried out at least in part by flash controller 280, at least in part by host device 310 (for example, by execution of executable code 340 in RAM 330 by host-side processor 320 or in any other manner), and any other location and in any other manner.

The skilled artisan will appreciate that "peripheral flash storage devices" are not the only class of flash memory storage devices. For example, certain mobile phones, desktop or laptop computers, PDA devices or other electronic devices may also include flash memory and a flash controller, and may not necessarily be configured to couple with a host device and/or provide data reading services and/or data writing service for a host device.

The skilled artisan will appreciate that the flash memory devices described in FIGS. 1A-1B are just one class of peripheral storage memory device, and other memory devices may include other types of volatile memory, such as magnetic memory (for example, magnetoresistive random-access memory (MRAM) or hard disk platters). Furthermore, it is appreciated that the some peripheral storage devices may use volatile memory instead of, or in addition to, flash memory 270.

Multi-Die Flash Devices

Although flash memory 270 is illustrated as a single unit in FIG. 1B, it is appreciated by the skilled artisan that flash memory 270 may reside on a single die or may reside on multiple dies. FIG. 2A (prior art) is a block diagram of a multi-die flash memory 270 that includes N flash dies, where N is a positive integer. On each flash die resides a plurality of flash memory cells (not shown in FIG. 2A).

It is appreciated that memory other than flash memory (for example, random-access memory (RAM) such as dynamic RAM (DRAM) or static RAM (SRAM)) may also be provided as multiple dies.

Flash Memory Cells and Flash Blocks

In flash memory devices, the indivisible unit of data storage is the flash memory "cell". FIG. 2B (prior art) illustrates a cross-section of a typical prior-art electrically-erasable non-volatile memory cell 100 (NAND flash). A metal gate 181 is deposited over an insulating oxide layer 183 atop a semiconductor channel 185, thereby forming a metal-oxide-semiconductor field-effect transistor (MOSFET). During fabrication, a floating gate 187 is embedded entirely within oxide layer 183, such that floating gate 187 is completely insulated electrically from all conducting paths. Electrons deposited on floating gate 187 cannot normally drain off and therefore tend to remain in place. A suitable amount of electrical charge thus present on floating gate 187 creates a static electrical field which, because of the field effect, influences the charge carriers in semiconductor channel 185, thereby allowing the conductivity of semiconductor channel 185 to indicate the relative amount of charge on floating gate 185. Hence a suitable charge on floating gate 187 can serve as non-volatile data storage. For programming, charge is injected onto floating gate 187, and for erasing, charge is removed therefrom. Both of these operations are accomplished via quantum-mechanical processes such as the tunneling effect and the hot electron effect. Oxide layer 183 is extremely thin, so that in the presence of a suitably-high attractive electrical field the wavefunction of an electron residing in semiconductor channel 185 can extend across oxide layer 183 and overlap floating gate 187. Under such conditions, there is a significant probability that an electron in semiconductor channel 185 will cross through oxide layer 183 and appear on floating gate 187. This phenomenon is exploited to program cell 100. In Single-Level Cell ("SLC") flash memory, a cell stores only a single bit (data values of '0' and '1'). In Multi-Level Cell ("MLC") flash technology, a cell can store 2 bits by exhibiting 4 distinct voltage levels on floating gate 187 (data values of '00', '01', '10', and '11'). More generally, a MLC cell can store n bits by exhibiting $2^n$ distinct voltage levels on floating gate 187. Certain threshold values of the conductivity of semiconductor channel 185, corresponding to different amounts of charge on floating gate 187, are predetermined to unambiguously discriminate between different data values.

Reference is now made to FIG. 2C. Cells within a memory device are arranged in an array, usually having subdivisions. A number of cells are commonly configured into a "page" 110, which contains cell 100, along with similar cells 102 and 104, and so forth. Likewise, a number of pages are commonly configured into a "block" 120, which contains page 110, along with similar pages 112 and 114, and so forth. Finally, a number of blocks make up an entire device 130, which contains block 120, along with similar blocks 122 and 124, and so forth.

It is appreciated that memory other than flash memory (for example, random-access memory (RAM) such as dynamic RAM (DRAM) or static RAM (SRAM)) may also be organized into cells, pages and blocks.

Word Lines

Reference is now made to FIG. 2D (prior art) which illustrates an array 10 of cells 100. Cells 100 are accessed by word lines 103 connected to control gates of cells 100 and by bit lines 107 connected to array 10 at the drain side. Bit line 107 is selected by a bit line select (drain side) 109 and a bit line select (source side) 111. Typically, in some NAND flash devices, not all cells 100 have the same reliability. For example, cells that are closer to the bit line select (drain side) 109 are more sensitive to disturbance errors than other cells 105, while cells closer to the source side select 111 have better reliability characteristics.

It is appreciated that memory other than flash memory (for example, random-access memory (RAM) may also be accessible using word lines and bit lines.

SUMMARY OF EMBODIMENTS OF THE INVENTION

Various embodiments address these and related issues, examples of which embodiments, including methods and systems, are provided herein. One embodiment is a method for handling error correction for a memory. This method comprises the steps of: a) writing first data to the memory; b) determining a value of an operational parameter, the determined value being a consequence of the writing of the first data; c) subsequent to the writing and to the determining, reading second data from the memory; and d) correcting errors in the second data according to the determined operational parameter value that is a consequence of the writing of the first data.

The aforementioned method may be implemented for any volatile or non-volatile memory, including but not limited to flash memory, optical storage, magnetic memory, static random access memory (SRAM) and dynamic random access memory (DRAM).

In some instances, the first data is the same as the second data.

Alternatively, the first data may be different from the second data.

In some instances, the first data may be written to and the second data may be read from the same set of one or more memory cells.

Alternatively, i) the first data may be written to a first set of one or more memory cells; and ii) the second data may be read from a second set of one or more memory cells, the second set being different from the first set.

For the implementation where the second set of memory cells is different from the first set of memory cells, there are a number of specific cases that are disclosed herein.

In one example, the first and second memory cell sets may be disjoint sets.

Alternatively, the first set of memory cells and the second set of memory cells may include at least one common memory cell. In one non-limiting example, the first set of memory cells may be a subset of the second set of memory cells. In another non-limiting example, the second set of memory cells may be a subset of the first set of memory cells.

In some instances, i) the first data may be written to a first set of one or more memory cells; ii) the second data may be read from a second set of one or more memory cells; and iii) the correcting of errors of the second data according to the operational parameter value that is a consequence of the writing of the first data may be effected only if a subset of the first set of memory cells and a subset of the second set of memory cells co-reside on a common die.

In some instances, i) the first data may be written to a first set of one or more memory cells; ii) the second data may be read from a second set of one or more memory cells; and iii) the correcting of errors of the second data according to the operational parameter value that is a consequence of the writing of the first data may be effected only if a subset of the first set of memory cells and a subset of the second set of memory cells co-reside in a common memory cell block.

In some instances, i) the first data may be written to a first set of one or more memory cells; ii) the second data may be read from a second set of one or more memory cells; and iii) the correcting of errors of the second data according to the operational parameter value that is a consequence of the writing of the first data may be effected only if a subset of the first set of memory cells and a subset of the second set of memory cells co-reside on a common wordline.

In various examples: i) the determined operational parameter value may be related to a measure of a reliability of the writing of the first data and/or (ii) the determined operational parameter value may describe a number of bits left in incorrect state at the end of the writing of the first data and/or (iii) the determined operational parameter value may describe a number of programming iterations used in the writing of the first data and/or (iv) the determined parameter value may describe a time required for the writing of the first data.

A number of techniques for correcting errors according to the determined operational parameter are described herein.

In one example, the correcting of errors according to the determined operational parameter value may include selecting a decoding bus width size in accordance with the determined operational parameter value.

In another example, the correcting of errors according to the determined operational parameter value may include: i) choosing one of a first decoder and a second decoder in accordance with the determined operational parameter value; and ii) correcting errors using only the chosen decoder of the first and second decoders.

In yet another example, the correcting of errors according to the determined operational parameter value may include: A) choosing one of a first mode of a decoder and a second mode of the decoder in accordance with the determined operational parameter value; and B) correcting errors using only the chosen mode of the first and second modes.

In yet another example, the correcting of errors according to the determined operational parameter value may include deciding whether: i) to attempt to correct errors using a lighter-weight decoder or ii) to attempt to correct errors using only a heavier-weight decoder that is heavier than the lighter weight decoder.

In yet another example, the correcting of errors according to the determined operational parameter value may include deciding whether: i) to attempt to correct errors using a faster decoder or ii) to attempt to correct errors using only a slower decoder that is slower than the faster decoder.

In yet another example, the correcting of errors according to the determined operational parameter value may include deciding whether: i) to attempt to correct errors using a lighter-weight mode of a particular decoder or ii) to attempt to correct errors using only a heavier-weight mode of the particular decoder that is heavier than the lighter weight mode.

In yet another example, the correcting of errors according to the determined operational parameter value may include deciding whether: i) to attempt to correct errors using a faster mode of a particular decoder or ii) to attempt to correct errors using only a slower mode of the particular decoder that is slower than the faster mode.

In yet another example, the correcting of errors in the second data according to the determined operational parameter value may include determining, in accordance with the determined operational parameter value, one or more bit-probability values for the second data.

Another embodiment is a data storage device comprising: a) a memory; and b) a controller operative to: i) write first data to the memory; ii) determine a value of an operational parameter, the determined value being a consequence of the writing of the first data; iii) subsequent to the writing and to the determining, read second data from the memory; and iv) correct errors in the second data according to the determined operational parameter value that is a consequence of the writing of the first data.

Exemplary memories include but are not limited to flash memories, an optical storage, magnetic memories, static random access memory (SRAM) and dynamic random access memory (DRAM).

In some instances, the controller may be operative such that first data is the same as the second data. Alternatively or additionally, the controller may be operative such that the first data is different from the second data.

In some instances, the memory may include a plurality of memory cells and the controller may be operative to write the first data and read the second data from the same set of one or more of the memory cells.

Alternatively or additionally, the memory may include a plurality of memory cells and the controller may be operative: i) to write the first data to a first set of one or more of the memory cells; and ii) to read the second data from a second set of one or more of the memory cells, the second set being different from the first set.

For the implementation where the second set of memory cells is different from the first set, a number of implementations are described. In one example, the memory may include a plurality of memory cells and the controller may be operative such that the first set of memory cells and second set of memory cells include at least one common memory cell.

In yet another example, the controller may be operative such that the first and second memory cell sets are disjoint sets.

In one example relating to the case where the first set and the second set include at least one common memory cell, the controller may be operative such that first set of memory cells is a subset of the second set of memory cells.

In another example relating to the case where the first set and the second set include at least one common memory cell, the controller may be operative such that the second set of memory cells is a subset of the first set of memory cells.

In some instances, the memory may include a plurality of memory cells and the controller may be operative: i) to write the first data to a first set of one or more of the memory cells; ii) to read the second data from a second set of one or more of the memory cells; and iii) to effect the correcting of the second data according to the operational parameter value that is a consequence of the writing of the first data only if a subset of the first set of memory cells and a subset of the second set of memory cells co-reside on a common die of the memory.

In some instances, the memory may include a plurality of memory cells and the controller may be operative: i) to write the first data to a first set of one or more of the memory cells; ii) to read the second data from a second set of one or more of the memory cells; and iii) to effect the correcting of the second data according to the operational parameter value that is a consequence of the writing of the first data only if a subset of the first set of memory cells and a subset of the second set of memory cells co-reside in a common memory cell block of the memory.

In some instances, the memory may include a plurality of memory cells and the controller may be operative: i) to write the first data to a first set of one or more of the memory cells; ii) to read the second data from a second set of one or more of the memory cells; and iii) to effect the correcting of the second data according to the operational parameter value that is a consequence of the writing of the first data only if a subset of the first set of memory cells and a subset of the second set of memory cells co-reside on a common wordline.

As noted above, a number of techniques for correcting errors according to the determine operational parameter are described herein, and the controller of the data storage devices may be operative to implement any of the presently-disclosed techniques.

Thus, in one example, the controller may be operative such that the correcting of errors according to the determined operational parameter value includes selecting a decoding bus width size in accordance with the determined operational parameter value.

In another example, the controller may be operative such that the correcting of errors according to the determined operational parameter value includes: i) choosing one of a first decoder and a second decoder in accordance with the determined operational parameter value; and ii) correcting errors using only the chosen decoder of the first and second decoders.

In yet another example, the controller may be operative such that the correcting of errors according to the determined operational parameter value includes: i) choosing one of a first mode of a decoder and a second mode of the decoder in accordance with the determined operational parameter value; and ii) correcting errors using only the chosen mode of the first and second modes.

In yet another example, the controller may be operative such that the correcting of errors according to the determined operational parameter value includes deciding whether: i) to attempt to correct errors using a lighter-weight decoder or ii) to attempt to correct errors using only a heavier-weight decoder that is heavier than the lighter weight decoder.

In yet another example, the controller may be operative such that the correcting of errors according to the determined operational parameter value includes deciding whether: i) to attempt to correct errors using a faster decoder or ii) to attempt to correct errors using only a slower decoder that is slower than the faster decoder.

In yet another example, the controller may be operative such that the correcting of errors according to the determined operational parameter value includes deciding whether: i) to attempt to correct errors using a lighter-weight mode of a particular decoder or ii) to attempt to correct errors using only a heavier-weight mode of the particular decoder that is heavier than the lighter weight mode.

In yet another example, the controller may be operative such that the correcting of errors according to the determined operational parameter value includes deciding whether: i) to attempt to correct errors using a faster mode of a particular decoder or ii) to attempt to correct errors using only a slower mode of the particular decoder that is slower than the faster mode.

In yet another example, the controller may be operative such that the correcting of errors according to the determined operational parameter value includes determining, in accordance with the determined operational parameter value, one or more bit-probability values for the second data.

Another embodiment is a host device comprising: a) a host-side storage; b) a host-side processor; c) a host-side interface for coupling with a memory device; and d) driver code residing in the host-side storage, wherein execution of the driver code by the host-side processor is operative to: i) write first data to the memory device; ii) determine a value of an operational parameter, the determined value being a consequence of the writing of the first data; iii) subsequent to the writing and to the determining, read second data from the memory device; and iv) handle error correction of the second data according to the determined operational parameter value that is a consequence of the writing of the first data.

In some instances, the driver code may be operative such that first data is the same as the second data.

In some instances, the driver code may be operative such that the handling of error correction includes issuing a command, via the host-side interface, to handle the error correction of the second data according to the determined operational parameter.

In some instances, the driver code may be operative such that the handling of error correction includes correcting errors, on the host side, in the second data according to the determined operational parameter value that is a consequence of the writing of the first data.

Another embodiment is a system for handling error correction, the system comprising: a) a flash data-writer operative to write first data to a memory; b) an operational-parameter determiner operative to determine a value of an operational parameter, the determined value being a consequence of the writing of the first data; c) a data-reader operative, subsequent to the writing and to the determining, to read second data from the memory; and d) an error correction element operative to correct errors in the second data according to the determined operational parameter value that is a consequence of the writing of the first data.

In some instances, the system may be operative such that first data is the same as the second data. Alternatively or additionally, the system may be operative such that first data is different from the second data.

In some implementations, the error correction element may include a hardware decoder.

In some implementations, the error correction element may include an algebraic decoder.

In some implementations, the error correction element may include a soft decoder.

Another embodiment is a computer readable medium having stored therein computer readable program code for handling error correction, the program code being operable to: a) write first data to a memory; b) determine a value of an operational parameter, the determined value being a consequence of the writing of the first data; c) subsequent to the writing and to the determining, read second data from the memory; and d) correct errors in the second data according to the determined operational parameter value that is a consequence of the writing of the first data.

Another embodiment is a controller for a memory, the flash memory, the controller comprising: a) circuitry that is operative to: i) write first data to the memory; ii) determine a value of an operational parameter, the determined value being a consequence of the writing of the first data; iii) subsequent to the writing and to the determining, read second data from the flash memory; and iv) correct errors in the second data according to the determined operational parameter value that is a consequence of the writing of the first data.

In some instances, the circuitry may includes at least one of software and firmware.

In some instances, the circuitry may be operative such that the first data is the same as the second data. Alternatively or additionally, the circuitry may be operative such that first data is different from the second data.

It is noted that features described above as pertaining to certain embodiments may also be included in other embodiments, unless indicated to the contrary herein below.

BRIEF DESCRIPTION OF THE DRAWINGS

FIGS. 9A-9B describe different possible relationship between two sets of flash memory cells.

DETAILED DESCRIPTION OF EMBODIMENTS

Figure 1A:
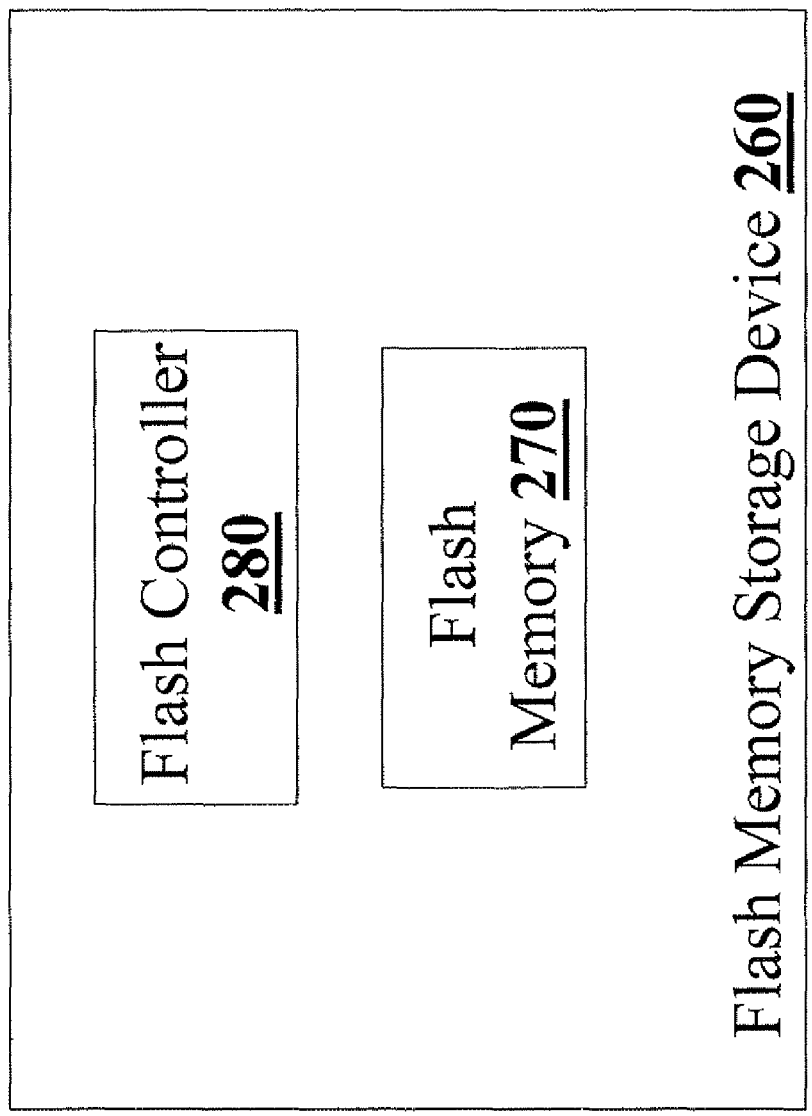
FIG. 1A is a block diagram of a conventional flash memory storage device 260 (prior art).
Figure 1B:
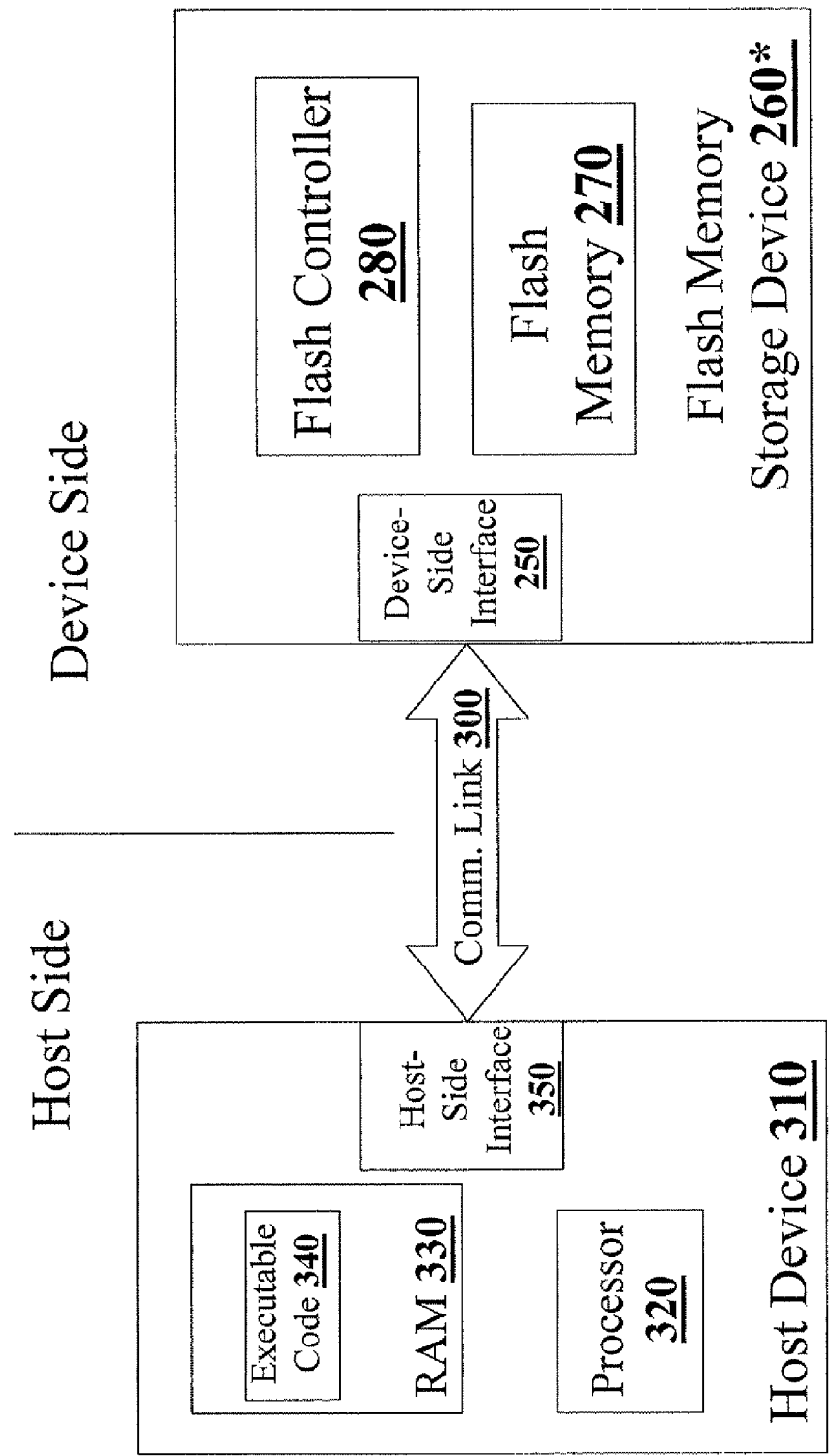
FIG. 1B is a block diagram of a conventional peripheral flash memory storage device that is coupled with a host device.
Figure 2A:
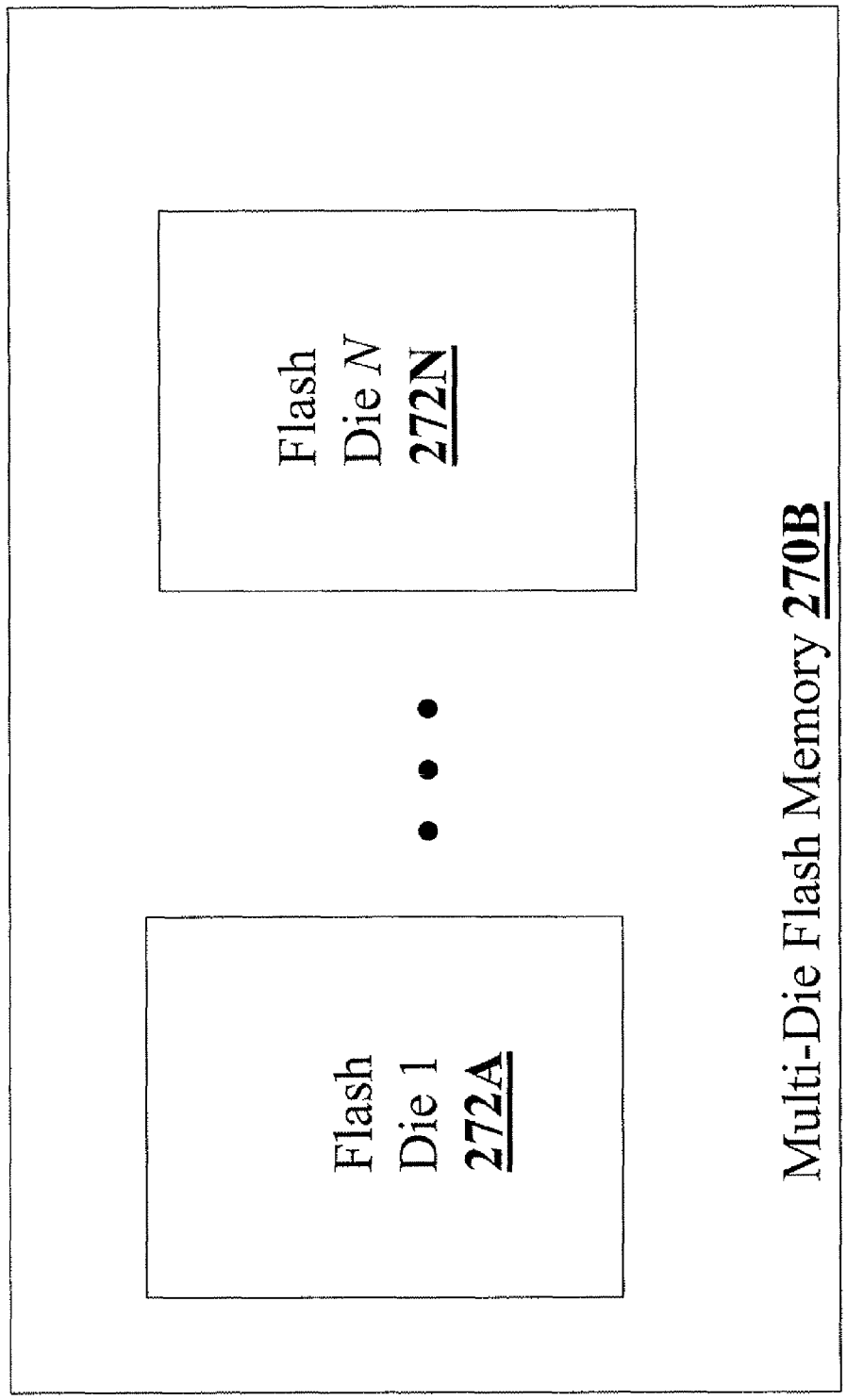
FIG. 2A is a block diagram of a multi-die conventional flash memory that includes N flash dies, where N is a positive integer.
Figure 2B:
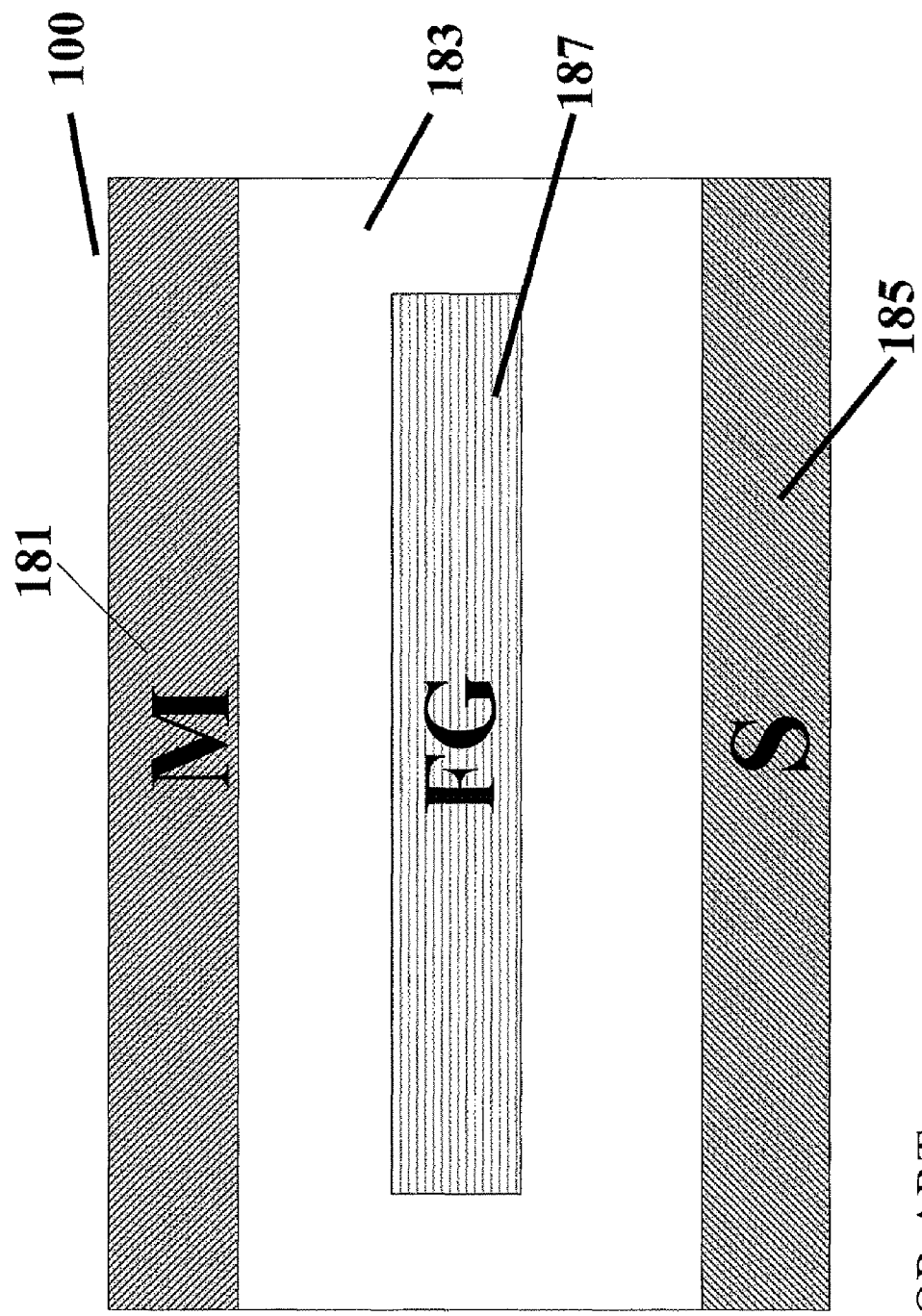
FIG. 2B illustrates a cross-section of a conventional electrically erasable non-volatile memory cell (NAND flash).
Figure 2C:
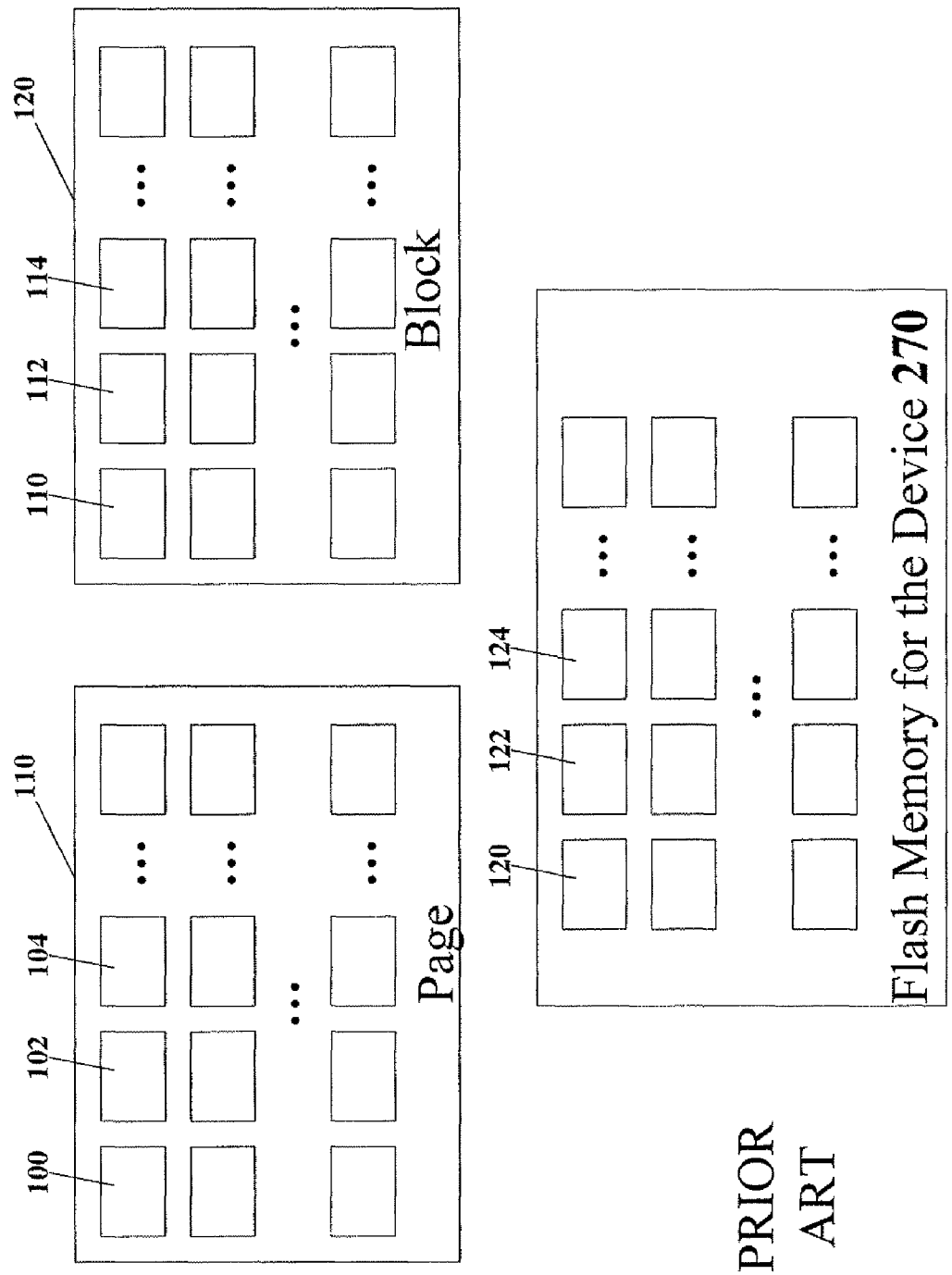
FIG. 2C illustrates a conventional flash memory divided into multiple blocks, pages and cells.
Figure 2D:
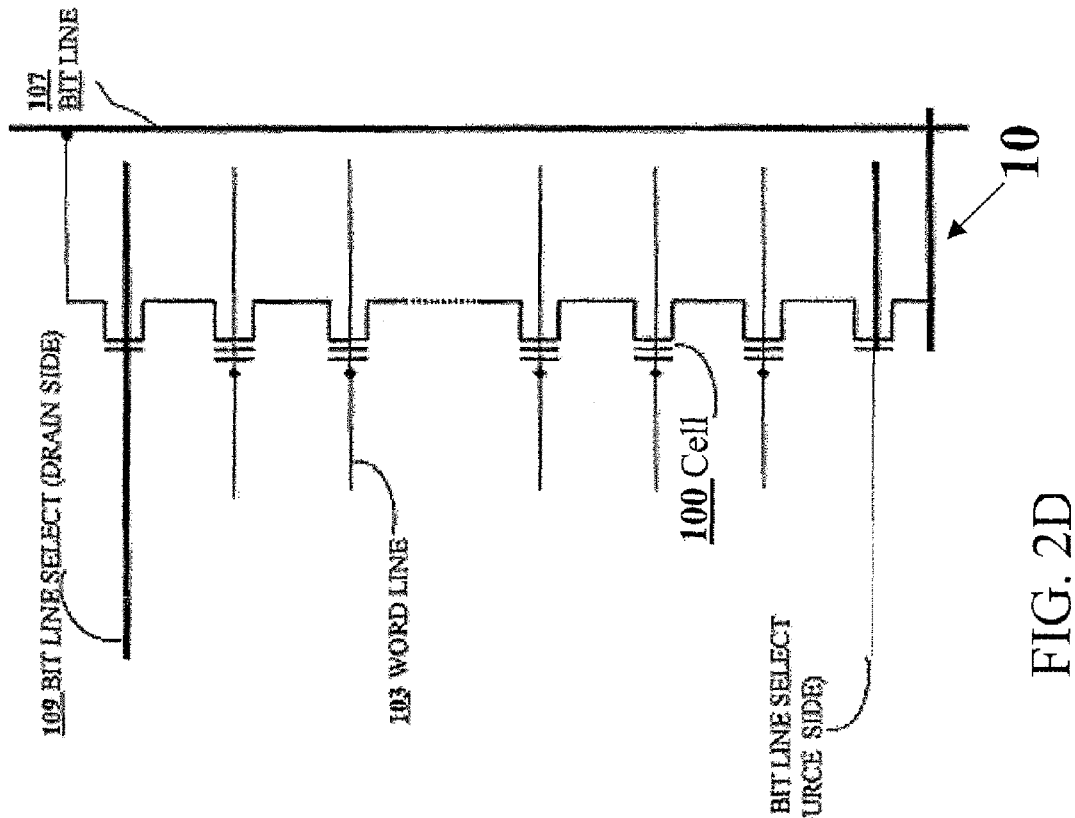
FIG. 2D illustrates a conventional array of cells accessed by word lines and by bit lines.

The claims below will be better understood by referring to the present detailed description of example embodiments with reference to the figures. The description, embodiments and figures are not to be taken as limiting the scope of the claims. It should be understood that not every feature of the presently disclosed methods and apparatuses is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to"), rather than the mandatory sense (i.e. meaning "must").

The present inventor is now disclosing methods and apparatus for correcting errors in data read from a memory in accordance with a value of a determined operational parameter that is a consequence of a previous data-writing to the memory.

In some embodiments, the memory is a flash memory.

Nevertheless, it is appreciated that the presently-disclosed techniques, apparatus and computer readable medium also relate to memories other than flash memory. Exemplary memories include but are not limited to non-volatile memories other than flash memory (for example, magnetic memories or optical storage) and volatile memories such as SRAM or DRAM.

Exemplary magnetic memories include but are not limited to magnetoresistive random-access memories (MRAM) and hard disk platters.

Thus, when certain teachings are explained in terms of "flash memory," it is appreciated that these teachings may also be applicable to other memories other than flash memory.

Before describing various embodiments in detail and with reference to the drawings, a first discussion relating to error correction in flash memory is presented, a second discussion relating to strategies for using operating parameter value(s) is presented, and then several use cases are briefly described.

Error Correction in Flash Memory Devices

A general overview of using ECC in flash memories is presented below and includes the following steps:

(1) Before writing data to the memory, an ECC algorithm is applied to the data in order to compute additional (i.e. redundant) bits, which are later used for error detection and correction. These redundant bits are often called "parity bits" or "parity". A combination of the data input into an ECC module and the parity output by that module is called a codeword. Each different value of input data to an ECC module results in a different codeword.

(2) The entire codeword (i.e., the original data and the parity) is recorded to the flash memory. It should be noted, that the actual size of NAND-type flash memory is larger than the size of the original data, and the memory is designed to accommodate parity as well.

(3) When the data are retrieved from the memory, the entire codeword is read again, and an ECC algorithm is applied to the data and the parity in order to detect and correct possible "bit flips" (i.e., errors).

It should be noted that the implementation of ECC may be done by hardware, software, or a combination of hardware and software. Furthermore, ECC may be implemented within a memory device, within a memory device controller, within a host computer, or may be "distributed" among these components of a system.

The algorithms in common use include Reed-Solomon, BCH, Hamming, and many others. Each ECC algorithm is composed of two parts—the part that receives the data bits and generates the parity bits (or equivalently, generates the codeword), and the part that receives the codeword and generates the corrected data bits. The first part is called the "encoder" and is used during writing, and the second part is called the "decoder" and is used, during reading. Each of the two parts may be implemented in either hardware or software, and it is also possible to have one part implemented in hardware while the other part implemented in software. It also is possible for each of the parts to be implemented in a combination of hardware and software.

Receiving the data bits and generating the corresponding codeword is termed "encoding." Receiving the codeword and generating the corrected data bits is termed "decoding."

It should be noted that there actually are two kinds of ECC. The kind of ECC described above, in which the identity of the data bits is preserved in the codeword, is called "systematic" ECC. In "nonsystematic" ECC, the data bits are converted to a codeword in which the identity of the original data bits is not preserved.

Selecting an algorithm, like BCH, as the ECC algorithm to be used in a flash memory system, does not uniquely define the selected solution. Any such ECC algorithm is actually not a single algorithm but a family of algorithms. The algorithms within the same family differ among themselves in the amount of data bits they are able to protect. An algorithm that needs to protect 100 data bits is not identical to an algorithm that needs to protect 10,000 data bits, even though the two algorithms are typically quite similar and operate on the same principles.

But even two algorithms of the same family that both protect the same number of data bits are not necessarily identical. The algorithms may differ in the level of reliability provided, or equivalently—in the number of bit errors in the data that the algorithms are able to correct. For example, one system may require the protection of chunks of 1,000 data bits against any combination of up to 3 bit errors (but not against the occurrence of 4 or more bit errors), while in another system a much higher reliability is desired and therefore it is required to protect chunks of 1,000 data bits against any combination of up to 10 bit errors. Typically, protecting against more errors requires the use of more parity bits (or longer codewords), making the ECC scheme less "efficient", where efficiency is measured by the ratio of the number of data bits in a codeword to the total number of bits in the codeword (including, in systematic ECC, both data bits and parity bits). This measure is typically called the "rate" of the ECC coding.

Different ECC algorithms and implementations also differ in other aspects—speed of the encoding process, speed of the decoding process, complexity of the encoding process, complexity of the decoding process, acceptable error rate in the input to the decoder (defined according to the quality of the storage cells), and more. The complexity of encoding and decoding is important not only because it affects the speed of the operation, but also because it affects the power consumption and silicon area of hardware implementations of the ECC scheme.

It is thus evident that the selection of an ECC solution for a memory system involves a complex trade-off between multiple considerations. Some non-limiting rules-of-thumb typical in the art of ECC designs are:

a. For a given memory reliability, the better the output reliability (or equivalently the higher the number of correctable errors) the lower the rate of the code (or equivalently, for systematic ECC, the more parity bits are required)

b. For a given memory reliability, the better the output reliability, the more complex is the decoder.

c. For a given level of output reliability, the higher the rate of the code, the more complex is the decoder.

d. For a given level of output reliability, the higher the rate of the code, the slower is the decoding.

When designing an ECC solution, one typically starts from the error rate at the decoder's input (dictated by the quality of the storage cells) and the desired output reliability (dictated by the application's requirements). Based on these numbers one typically selects a specific ECC family, calculates the required number of parity bits, and then estimates the speed and complexity of the encoder and decoder.

In some cases the most important consideration for the system's designer is the speed of the decoding, as this may put a limit on the speed of reading the data out from the memory. In such cases the designer may encounter a dilemma—the ECC scheme required for meeting the output reliability requirements may turn out to result in a quite complex decoder with slow operation, not satisfying the speed target of the system. But, on the other hand, selecting an ECC scheme that is relatively simple, and that results in fast decoding, does not provide the required output reliability level.

A Brief Discussion about Strategies for Using Operating Parameter Values and a Non-Limiting Example of an Operating Parameter Not wishing to be bound by this example, it is noted that the writing or programming of data to memory (e.g. flash memory or any other memory) can generate, as a 'by-product,' 'quality' or 'reliability' information about (i) the data written to the memory and/or (ii) the actual memory or a sub-subsection thereof.

It is now disclosed that it is useful to (i) determine an indication of the aforementioned quality and/or reliability information by determining a value of one or more parameters that are a consequence or 'by-product' of the writing of data to the memory and to (ii) subsequently, when correcting errors in data read back from the memory, use this captured "quality" and/or "reliability" information.

For example, in the event that the value of the operating parameter indicates that the memory data-writing was relatively "successful" and/or that the quality of the data written to the memory is relatively "high" and/or that the memory to which the data was written is a relatively "good medium" for storing data, then it may be useful to subsequently correct errors in data read from the memory in a relatively "optimistic" manner. Otherwise, a more "pessimistic" technique of correcting errors may be preferred.

Before describing the figures, five illustrative non-limiting use cases are described. First, a discussion is provided for two use cases relating to exemplary operating parameters.

Subsequently, three use cases that relate to the utilizing of a determined "operating parameter value" when correcting errors in data read from the memory are presented.

Two Use Cases Relating to Exemplary Operating Parameters

Many modern NAND flash devices are designed under the assumption that error correction is always used when reading data. Therefore, such devices allow page programming operations to be declared successful even when not all bits are in their correct value.

In one non-limiting example, a multi-level cell (MLC) NAND flash device may require its users to employ an ECC decoder capable of correcting 4 bit errors per each sector of 512 bytes. In this non-limiting example, the designer of the MLC NAND device would typically declare a flash data-writing or "programming" operation to be 'completed' and successful once the number of bits not yet correctly set is one or less. In other words, when only one incorrect bit remains, the device logic stops further efforts of programming that bit, relying on the ECC decoding to overcome the error.

In this non-limiting example, upon detecting that the number of bits not yet correctly set is one or less, the device stops programming iterations, and reports to the host that the data-writing to flash or programming has been successfully completed (for example, using the RDY signal).

It is noted that in the above non-limiting case, a consequence or by-product of the programming process is the useful information of the number of errors existing in the page as of the time that programming to the flash is completed. It is noted that the "number of errors existing in the page of the time of programming" is one example of an "operating parameter that is a consequence of the writing of the data."

A value of this operating parameter may be stored and used to advantage when later correcting errors in data read data from the flash memory, for example, data read from that page and/or a portion therefore and/or other pages in the flash memory.

It is appreciated that the above use case of an ECC decoder correcting 4 errors and the NAND device allowing one error is just one simplistic use case.

A second non-limiting use case relates to flash devices that have a much lower reliability (for example devices storing 3 bits per cell or 4 bits per cell).

In many implementations, an ECC decoder capable of correcting 100 bit errors is provided, and therefore the NAND designer elects to allow up to 20 incorrect bits in order to speed up the programming phase, relying on the ECC to "cover up" for those initial errors.

In this second use case, the information that can be provided to the ECC decoder when reading the data is not just a simple YES/NO indication as in the simple example above (i.e. the first use case), but is a number of initial errors in the range of 0 to 20. Thus, in this second non-limiting use case, the number of initial errors in the range of 0 to 20 is the value of the operating parameter This is valuable information that can be used to advantage by the ECC decoder, as further explained below.

It should be emphasized that the number of initial incorrect bits is just one example of an operating parameter that (i) is a consequence of writing data to flash memory and (ii) may be used later to correct errors in data read back from the flash.

Although these two use cases related specifically to systems where a flash programming operation is declared "successful" even when not all bits are set to their correct values, it is appreciated that this is not a limitation.

Three Use Cases that Relate to Exemplary Techniques for Utilizing a Value of a Determined Operating Parameter when Correcting Errors in Data Read from Flash Three illustrative non-limiting use cases that relate to exemplary techniques for utilizing a value of a determined operating parameter when correcting errors in data read from flash are now discussed. In particular, these three non-limiting use cases provide examples of relatively "optimistic" and "pessimistic" techniques for correcting errors. When the value of the operating parameter (i.e. that is a consequence of the data writing to flash) indicates that the writing of the data was relatively "successful" then a relatively "optimistic" technique for later correcting errors may be selected. Otherwise, a relatively "pessimistic" technique for later correcting errors may be selected.

According to a first non-limiting use case, the "optimistic" technique includes attempting to decode data using a relatively "lightweight" decoder (or a "lighter-weight" mode of a particular decoder) which consumes fewer computational resource but which is only effective at decoding data with relatively few errors. The more "pessimistic" technique includes using a "heavier" decoder (or a "heavier weight mode"). Embodiments related to this first non-limiting use case are discussed below with reference to FIGS. 5A-6B and 6A-6D.

A second non-limiting use case relates to the specific case of soft decoders. In the second non-limiting example, the "optimistic" technique includes selecting a relatively narrow decoding bus rather than a relatively wide decoding bus.

Using the narrow bus provides a lower power consumption, but the decoder might fail to converge to the correct data in cases with relatively large number of errors. The more "pessimistic" technique includes selecting a wider decoding bus. Soft decoders and algebraic decoders are discussed below. Embodiments related to this second non-limiting use case are discussed below with reference to FIG. 8.

A third non-limiting use case also relates to the specific case of soft decoders. In the third use case, one or more bit-probability values for the data in which errors are to be corrected are determined, in accordance with the operational parameter value. This may be useful for accelerating the convergence of the iterative probabilistic "soft" decoder. Embodiments related to this third non-limiting use case are discussed below with reference to FIG. 7.

Definitions

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

An "operating parameter" of writing data to memory (e.g. flash memory or any other memory) refers to a parameter describing how the writing operation occurs—for example, how much time the writing operation required, a number of programming iterations used in writing the data, etc. It is appreciated that the actual data written to memory during the writing operation (i.e. the original data and/or corrupted data and/or parity bits and/or the codeword representation) are not examples of "operating parameters."

The term "operating parameter that is a consequence of the writing" refers to an operating parameter whose value is a result of the actual writing of data to memory. The term "operating parameter that is a consequence of the writing" does not, therefore, refer to a pre-determined programming parameter used by a controller (for example, a flash memory device controller) to write data to the memory.

Because certain types of memory (for example, flash memory, magnetic memory, optical storage, or volatile memory) are "corrupting medium," one or more errors are sometimes introduced into "original" data that is written to the memory, so that when the data (i.e. a representation of the original data) is read back from the memory, one or more information bits are "flipped."

The process of reconstructing the original, error-free data from the data read back from the memory is "correcting errors." Although the term "correcting" errors is used in the plural, it is appreciated that "correcting errors" also refers to correcting a single error. It is appreciated that in some embodiments, the "correcting" of errors may also include one or more failed attempts to correct errors.

In order to correct errors, a "decoder" may be used, in order to recover the original data from a representation of a codeword. Some embodiments involve multiple decoders, including "lighter weight" decoders and "heavier weight decoders."

The terms "heavier weight" and "lighter weight" are used to compare two decoders and/or two modes of a single decoder. The "heavier weight" decoder (or heavier weight mode of a single decoder) either (i) consumes more current than the "lighter weight" counterpart and/or (ii) requires more memory (either for computer-executable code of the decoder itself and/or more memory for storing "intermediate results" of calculations when correcting errors) than the "lighter weight" counterpart and/or (iii) requires more computational operations than the "lighter weight" counterpart.

Figure 3A:
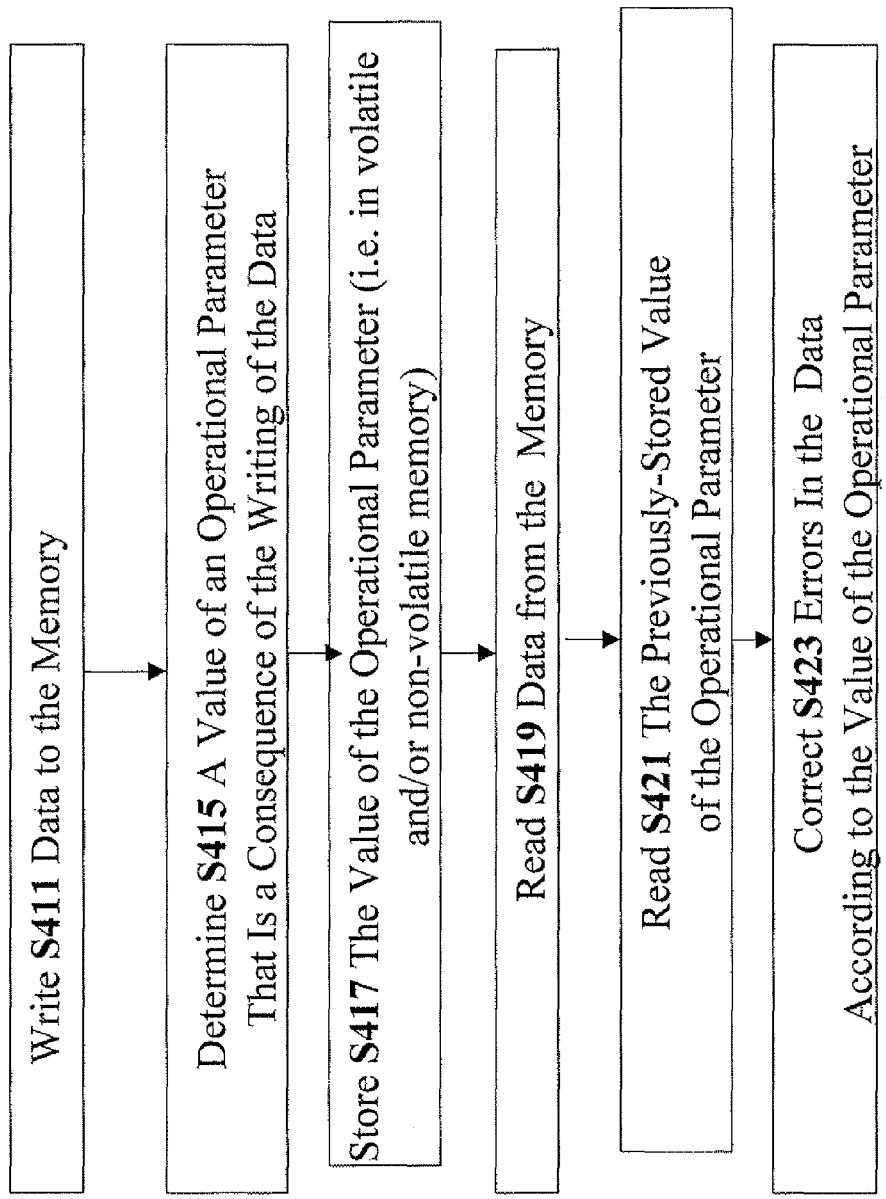
FIG. 3A-3B are flow charts of routines for handling error correction for a flash memory in accordance with some embodiments.

A Discussion of FIG. 3A

FIG. 3A is a flow chart of a routine for handling error correction for a memory in accordance with some embodiments.

In step S411, data is written to the memory. As noted earlier, because the memory is a corrupting medium, it is desired to store some combination of "original" data and one or more parity bits (which may be derived from the "original" data using an ECC and also saved in step S411). The parity bits will be used later, in step S423, to recover the "original" data.

Furthermore, because the memory is a corrupting medium, in some situations, the actual codeword itself is not written to the memory in step S411, but rather some partially-corrupted representation of the codeword, with one or more errors introduced. Of course, the representation of the codeword may be identical to the codeword, and in fact usually is identical to the codeword, but there is no a priori guarantee that the representation of the codeword is identical to the codeword.

In step S415, a value of an operational parameter that is a consequence of the writing of the first data is determined, and in step S417 the determined operational parameter is stored. It is appreciated that the determined operational parameter may be stored in any combination of volatile memory (for example, RAM) and/or non-volatile memory (for example, flash or magnetic storage or optical storage), and in any physical location(s).

One example of an operational parameter is a number of bits left in an incorrect state, as discussed above.

It is noted that the number of bits left in an incorrect state just one specific example, and any operational parameter (for example, an operational parameter indicative of the reliability of the programmed data and/or the memory to which the data is written) may determined (in step S415), stored (in step S417).

Exemplary operational parameters include but are not limited to a number of programming iterations used in writing the data (i.e. to complete programming) and a time required for writing the data. In some embodiments, the operational parameter is indicative of the reliability of the programmed data and/or the quality of the memory to which the data is written.

Furthermore, it is appreciated that values of multiple operational parameters may be determined, stored and used when correcting errors in the second data this is an example of "determining a value of an operational parameter that is a consequence of the writing of the first data" and "correcting errors . . . according to the determined operational parameter value." Additionally, it is appreciated that any mathematical function of one or more operational parameters is also considered an "operational parameter."

In step S419, the data written to the memory in step S411 is read back from the memory. It is noted that this data that is read back in step S419 is also a representation of the codeword—i.e. representing the "original" data and the parity bits.

In step S421, the value of the operational parameter previously stored in step S417 is read back from volatile and/or non-volatile memory.

In step S423, one or more errors in the read-back data are corrected according to the value of the operational parameter (i.e. which was determined in step S415 and stored in step S417). FIGS. 5A-5B, 6A-6D, and 7 provide flow charts of implementations of step S423, though it is appreciated that this is certainly not an exhaustive list, and that other implementations are possible.

In some embodiments, the error-correcting of step S423 is carried out immediately after the data-reading of step S419. Alternatively, the error correcting of step S423 may be carried out at any later time.

As with every routine disclosed herein, it is appreciated that not every step in FIG. 3A needs to be carried out in every embodiment, and that the order of steps is just one illustrative example, and not to be construed as limiting. For example, in some embodiments, step S421 is carried out before step S419.

Figure 3B:
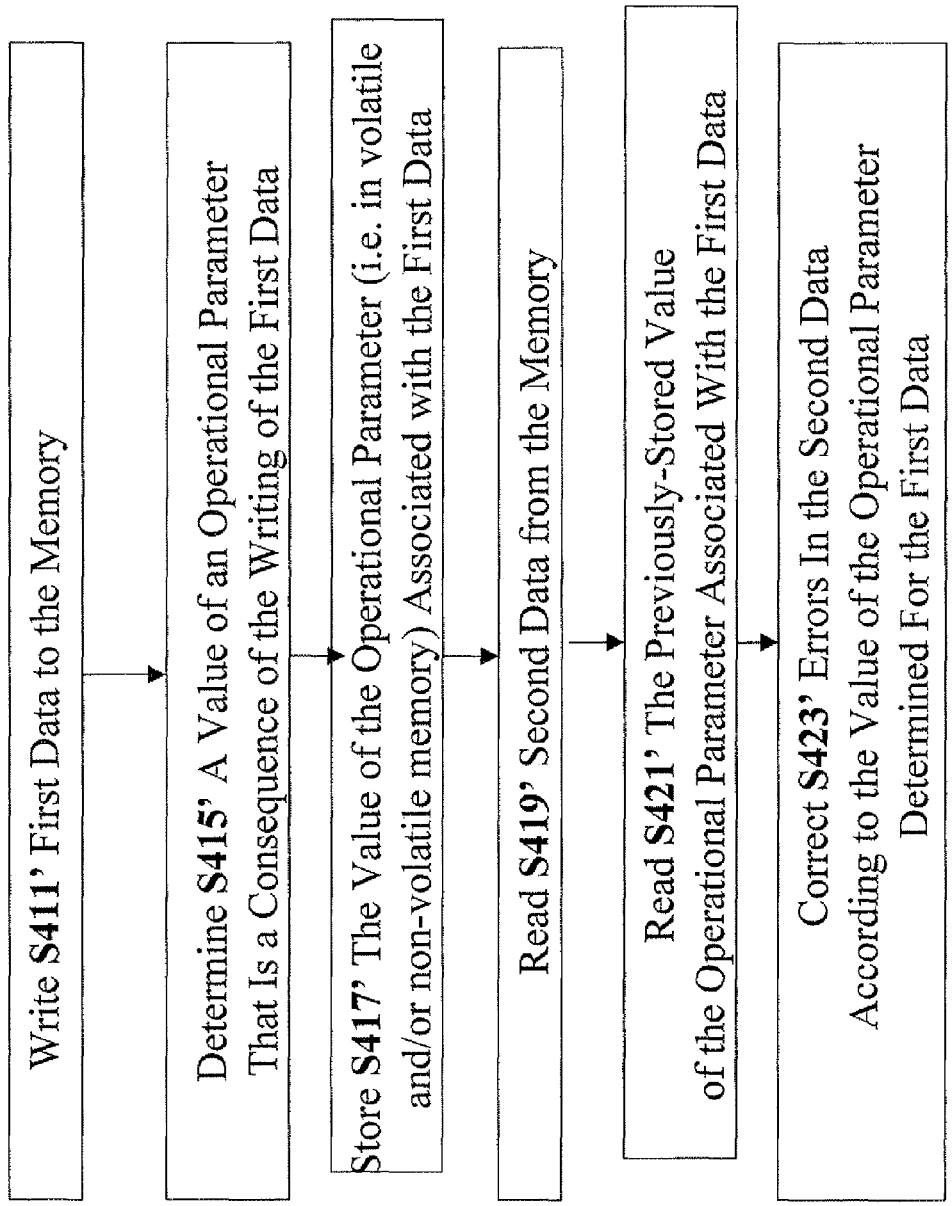

A Discussion of FIG. 3B

FIG. 3A relates to the specific case where the data written in step S411 and the data read in step S419 are the same data. Thus, in the example of FIG. 3A, information obtained about writing of particular data is used later when correcting errors in the same data as read back from the memory.

It is noted, however, that this is not a limitation. Thus, the concept of correcting errors in data read from the memory according to a determined operational parameter that is a consequence of a previous writing operation to the memory is not limited to the particular case of FIG. 3A, where the data written in step S411 and the data read in step S419 are the same data.

In particular, embodiments where information obtained about writing of particular data is used later when correcting errors in other data (i.e. other than the particular data) are also contemplated by the present inventor.

FIG. 3B is a flow chart of a routine for handling error correction for a memory in accordance with some embodiments. In the event that the "first data" is identical to the "second data," then FIG. 3B reduces to the flow chart of FIG. 3A.

Nevertheless, it is noted that FIG. 3B also relates to the case where the "first data" and the "second data" are different—i.e. FIG. 3B relates both to the case where the first data and the second data are the same (i.e. as in FIG. 3A) and to the case where both the first data and the second are different.

In the example of FIG. 3B, the steps are marked with a prime. Through the present disclosure, in the text and in the figures (except for FIG. 3A and the text describing FIG. 3A), it is understood that any step, even if not marked with a prime, relates both to (i) the case where the first and second data are the same (i.e. as in FIG. 3A) and (ii) to the more general case of FIG. 3B where the first and second data may or may not be different.

In one non-limiting example of the case where the "first data" and "second data" are different, the "first data" and the "second data" are stored in different sets of memory cells (for example, flash memory cells).

Various use cases describing different relations between a first memory cell set of one or more memory cells in which the first data reside and a second memory cell set of one or more memory cells in which the second data reside are described below with reference to FIGS. 9A-9B.

It is noted that unless otherwise specified, any presently disclosed routine may be implemented using a soft decoder(s) and/or an algebraic decoder(s). Soft decoders and algebraic decoders are discussed below.

Figure 4:
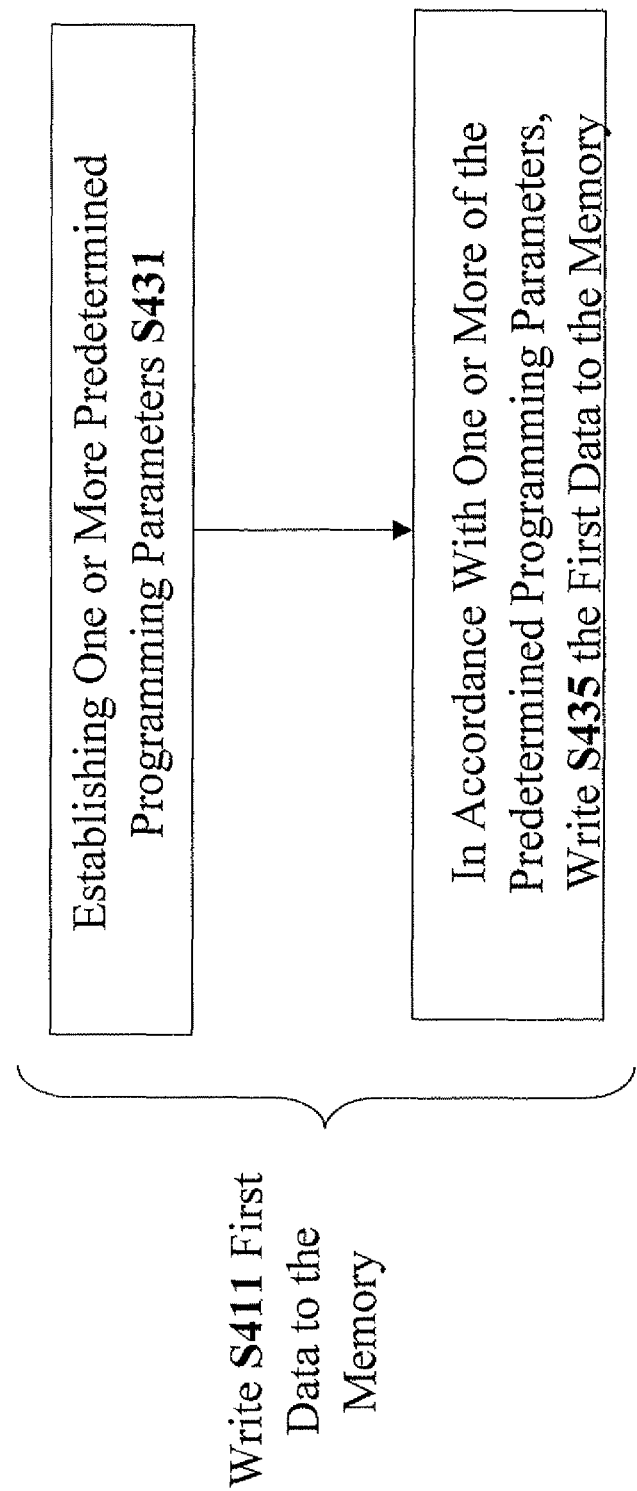
FIG. 4 is a flow chart of a routine for writing data to flash in accordance with some embodiments.

A Discussion of FIG. 4

FIG. 4 is a flow chart of a routine implementing step S411 in accordance with some embodiments.

In step S431, one or more pre-determined programming parameters are established, for example, by the device controller 280. Exemplary programming parameters include a programming iteration stepping voltage, a maximum programming voltage, a maximum number of iterations per programming operation, a programming base pulse duration and a programming iteration stepping duration.

In step S435, the first data is written to memory in accordance with one or more of the pre-determined programming parameters.

A Discussion of Exemplary Implementations of Step S423 with Reference to FIGS. 5A-5B, 6A-6D, and 7

Consider two decoders (or one decoder capable of operating in two different modes) with the following characteristics:

a. The first decoder is faster and/or is "lighter weight", but on the other hand is not guaranteed to succeed in producing the result of the decoding process.

b. The second decoder is slower and/or is "heavier weight", but is guaranteed to always produce the correct result of the decoding process (or at least is more likely to produce the correct result of the decoding process).

Typically, the higher the number of errors in the data, the more frequently the first decoder fails. Unfortunately, upon reading back data from the memory (for example, by reading back the representation of the codeword) in step S419, it is not always known a-priori how many errors are in the read-back data. Thus, it is not always known whether or not a "heavier weight" decoder (or heavier weight mode of a single decoder) is required, or a "lighter weight" decoder will suffice.

The present inventor is now disclosing that in the event that the value of the operating parameter (i.e. that is determined in step S415 and that is a consequence of the data writing to the memory) indicates that the writing of the data was relatively "successful" then a relatively "optimistic" technique for later correcting errors may be selected for correcting errors in the data read in step S419. Thus, in this case, it may be advantageous to "risk" correcting errors using the "lighter weight" decoder (or lighter weight mode of a single decoder). Otherwise, it may be preferable to correct errors using the "heavier weight" decoder or heavier weight mode of a single decoder.

Figure 5A:
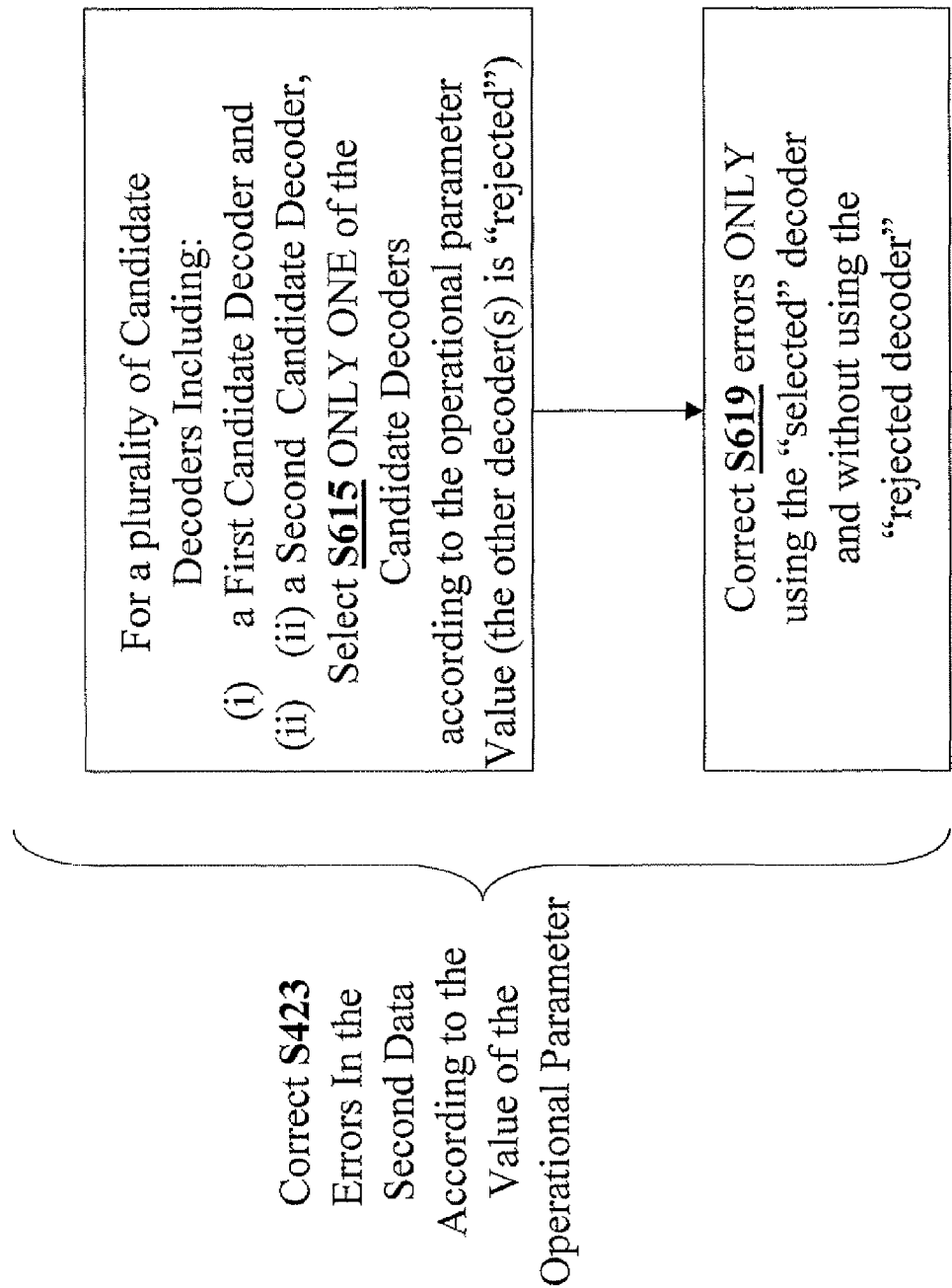
FIGS. 5A-5B, 6A-6D, 7 and 8 are flow charts of routines for correcting errors in second data in accordance with a value of an operational parameter that is a consequence of writing first data to flash.

Reference is now made to FIG. 5A. In step S615, a decoder is selected from a plurality of candidate decoders in accordance with the value of the operational parameter.

In step S619, errors are corrected only using the selected decoder and without using the unselected "rejected" decoder.

Figure 5B:
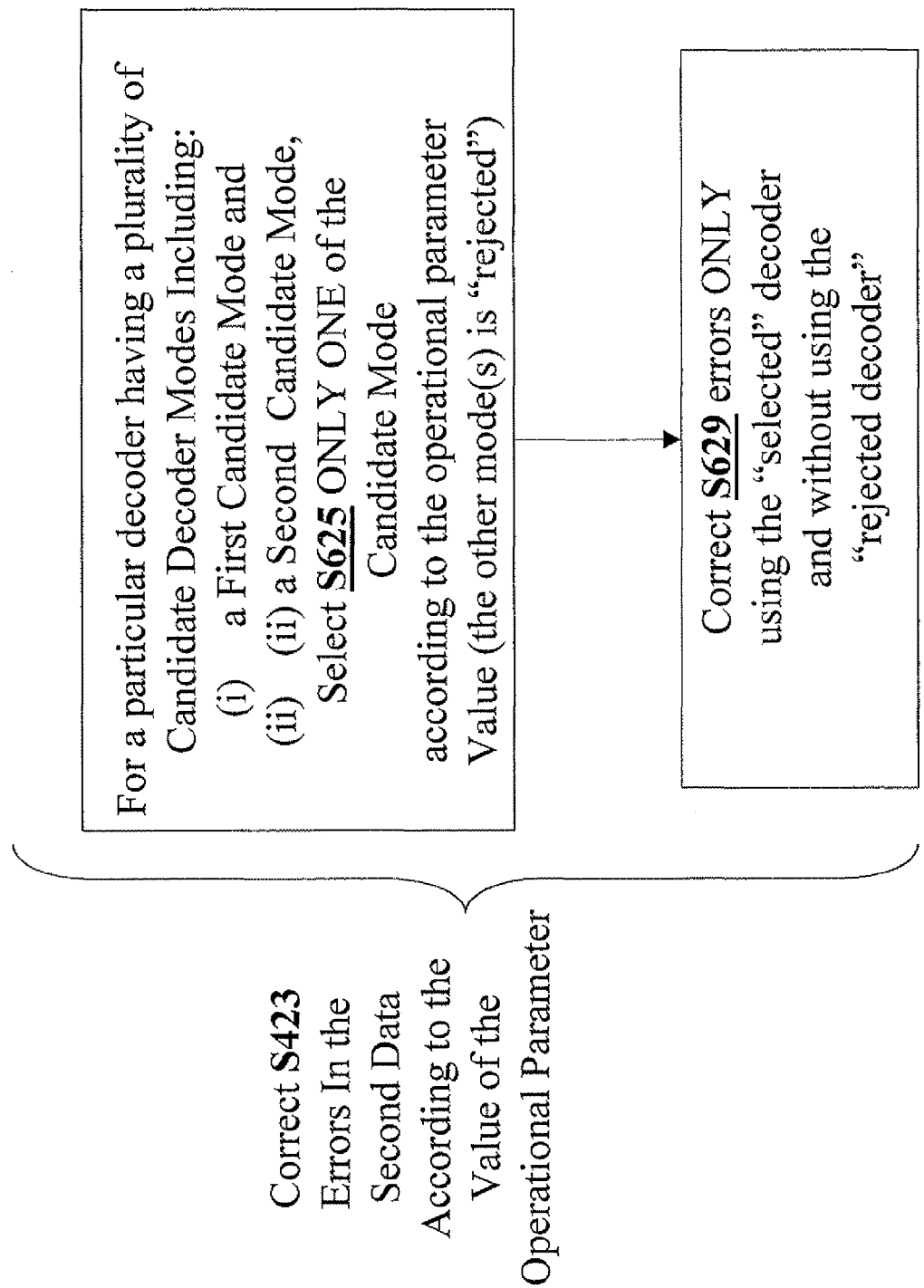

Reference is now made to FIG. 5B. In step S625, a mode of a given decoder is selected from a plurality of candidate decoder modes in accordance with the value of the operational parameter.

In step S629, errors are corrected only using the selected decoder mode and without using the unselected "rejected" decoder mode.

Figure 6A:
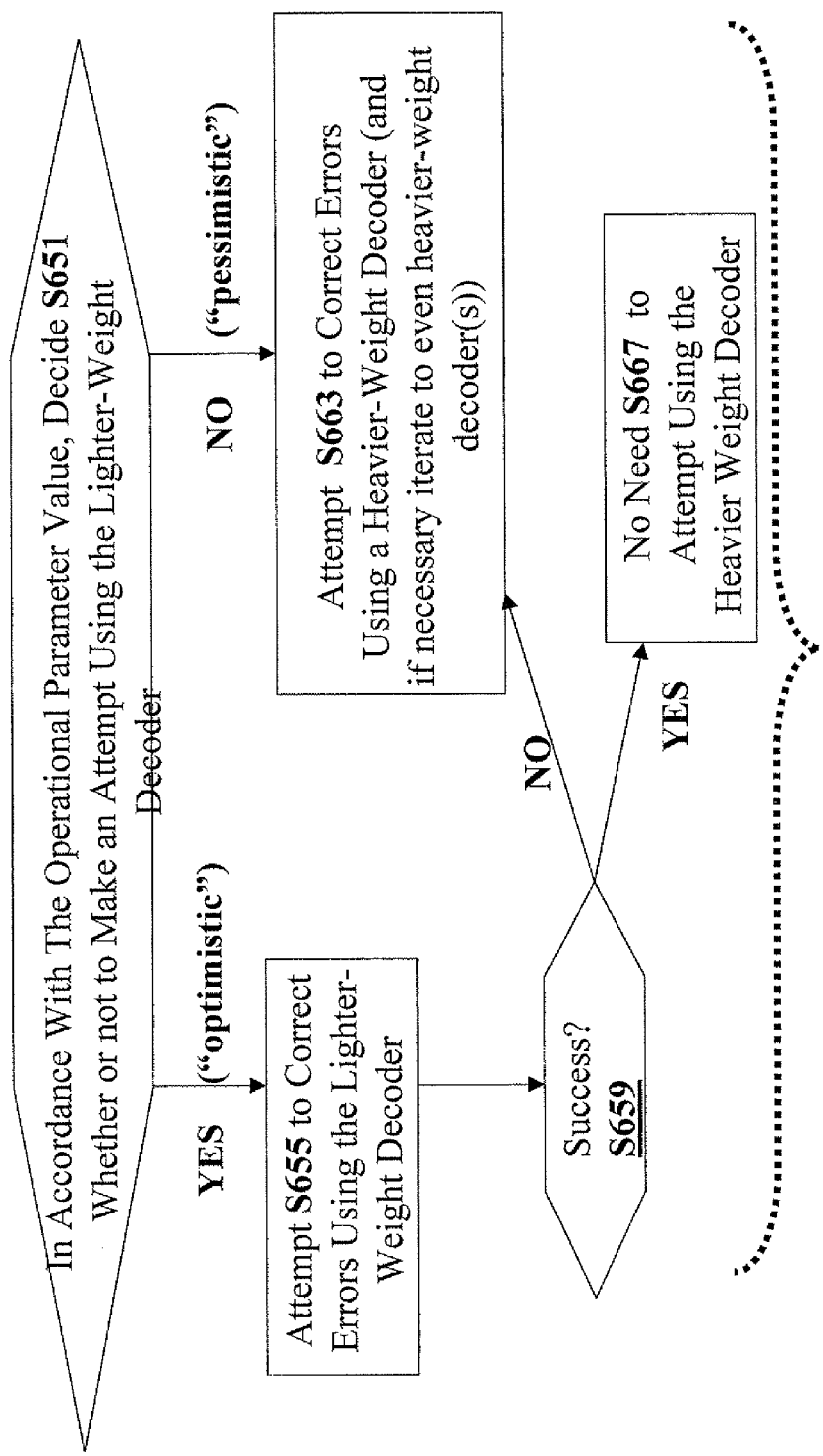

Reference is now made to FIG. 6A.

In step S651, a decision is made whether or not to attempt to correct errors using a lighter-weight decoder (i.e. of a plurality of candidate decoders) in accordance with the value of the operational parameter.

In the event that the value of the operational parameter indicates that a relatively "optimistic" error correction strategy may be adopted, an attempt is made in step S655 to correct errors using the lighter-weight decoder. If the lighter-weight decoder succeeds (see step S659) there is no need to attempt to correct errors using the heavier weight decoder (see step S667). If the lighter-weight decoder fails to correct errors, an attempt is then made S663 to correct errors using a heavier-weight decoder.

Furthermore, it is noted, with reference to step S651, that in the event that the value of the operational parameter indicates that a relatively "pessimistic" error correction strategy is preferable, that it is possible to skip step S665, and to attempt to correct errors (in step S663) using the heavier weight decoder rather than the lighter weight decoder.

Figure 6B:
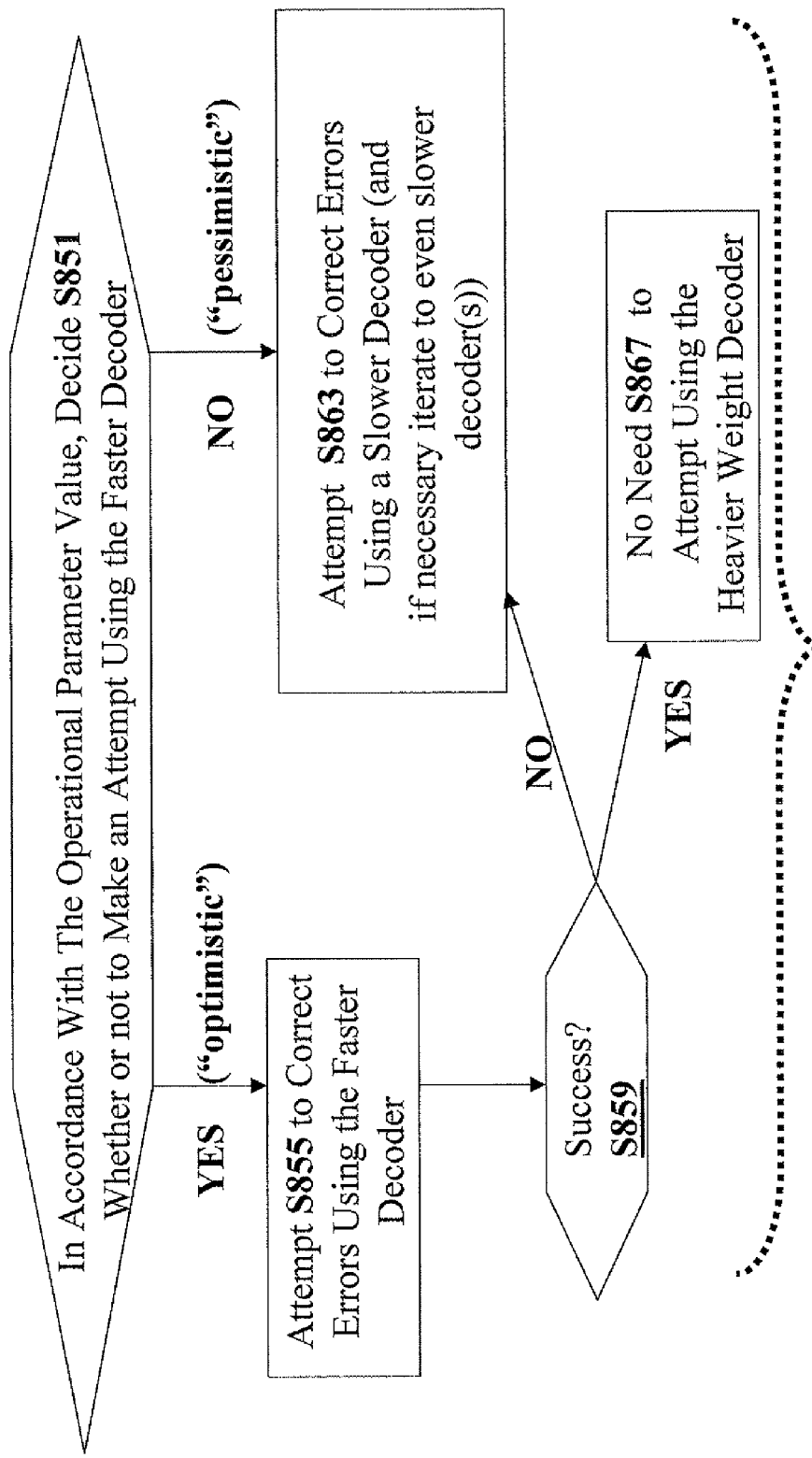

Reference is now made to FIG. 6B.

In step S851, a decision is made whether or not to attempt to correct errors using a faster decoder (i.e. of a plurality of candidate decoders) in accordance with the value of the operational parameter.

In the event that the value of the operational parameter indicates that a relatively "optimistic" error correction strategy may be adopted, an attempt is made in step S855 to correct errors using the faster decoder. If the faster decoder succeeds (see step S859) there is no need to attempt to correct errors using the slower decoder (see step S867). If the faster decoder fails to correct errors, an attempt is then made S863 to correct errors using a slower decoder.

Furthermore, it is noted, with reference to step S851, that in the event that the value of the operational parameter indicates that a relatively "pessimistic" error correction strategy is preferable, that it is possible to skip step S865, and to attempt to correct errors (in step S863) using the slower decoder rather than the faster decoder.

Figure 6C:
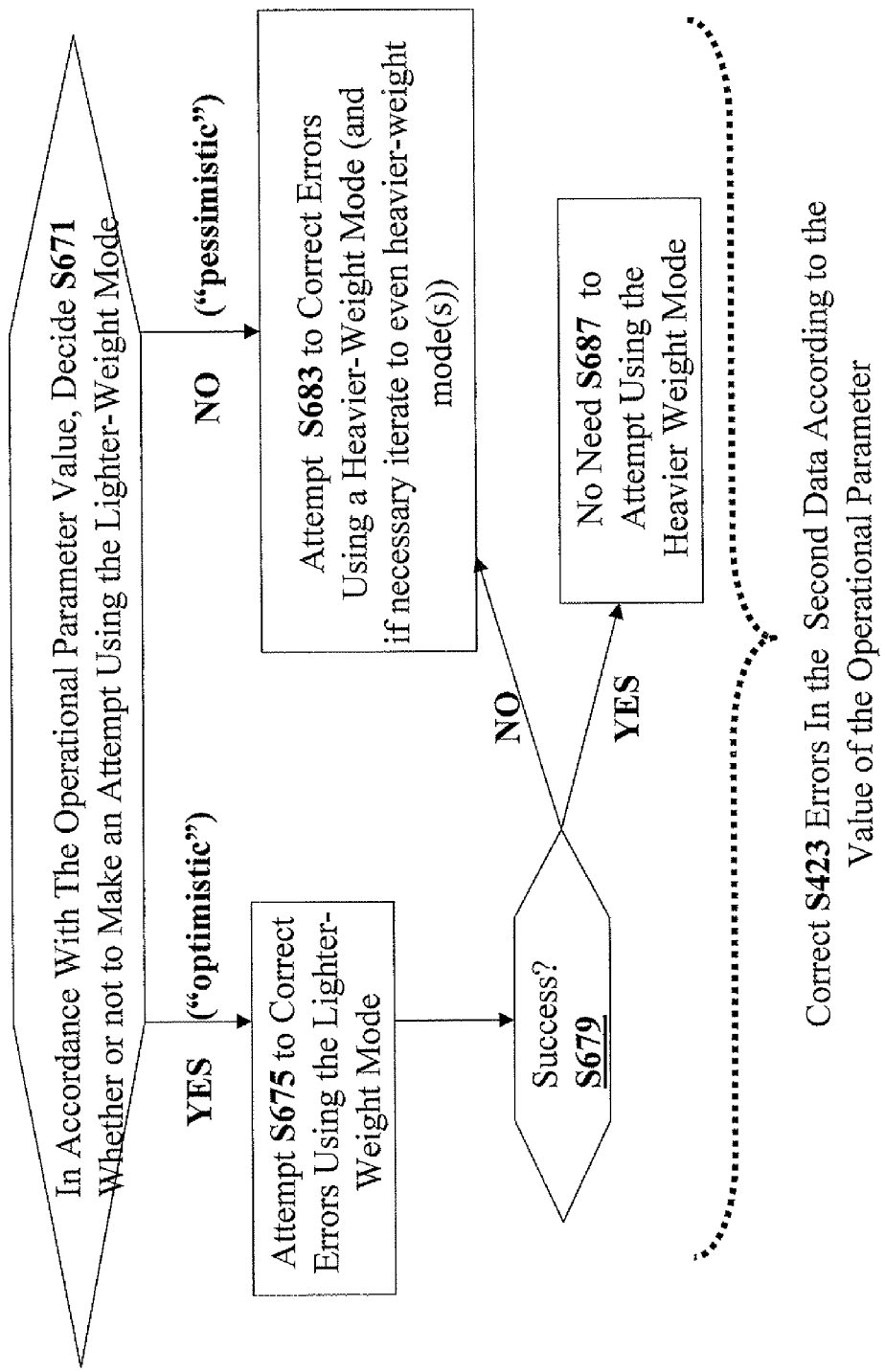

Reference is now made to FIG. 6C.

In step S671, a decision is made whether or not to attempt to correct errors using a lighter-weight mode (i.e. of a plurality of candidate decoder modes for a given decoder) in accordance with the value of the operational parameter.

In the event that the value of the operational parameter indicates that a relatively "optimistic" error correction strategy may be adopted, an attempt is made in step S675 to correct errors using the lighter-weight mode. If the lighter-weight mode succeeds (see step S679) there is no need to attempt to correct errors using the heavier weight mode (see step S687). If the lighter-weight mode fails to correct errors, an attempt is then made S683 to correct errors using a heavier-weight mode.

Furthermore, it is noted, with reference to step S671, that in the event that the value of the operational parameter indicates that a relatively "pessimistic" error correction strategy is preferable, that it is possible to skip step S675, and to attempt to correct errors (in step S683) using the heavier weight mode rather than the lighter weight mode.

Figure 6D:
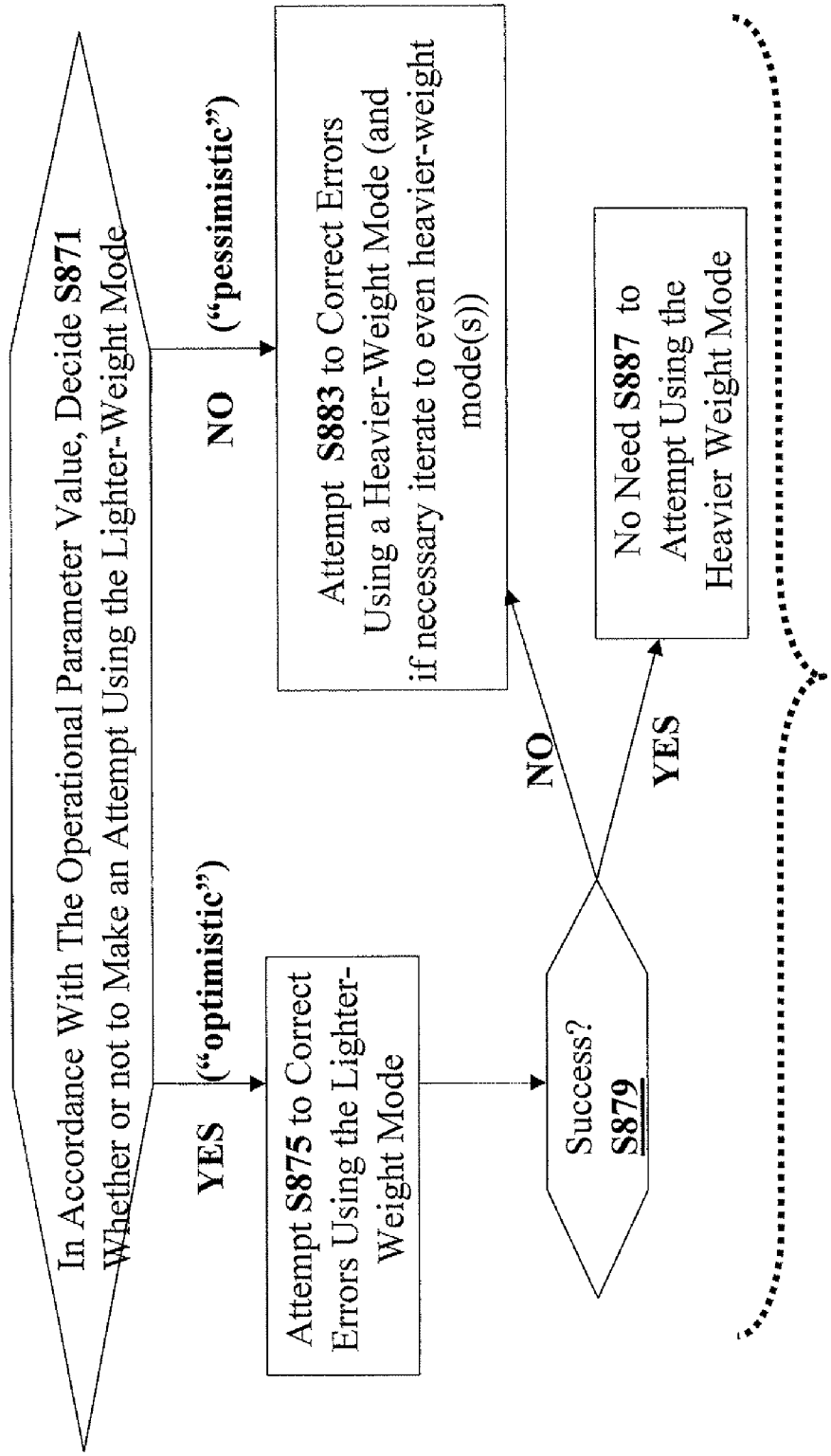

Reference is now made to FIG. 6D.

In step S871, a decision is made whether or not to attempt to correct errors using a faster decoder mode (i.e. of a plurality of candidate decoder modes) in accordance with the value of the operational parameter.

In the event that the value of the operational parameter indicates that a relatively "optimistic" error correction strategy may be adopted, an attempt is made in step S875 to correct errors using the faster decoder mode. If the faster decoder succeeds mode (see step S879) there is no need to attempt to correct errors using the slower decoder mode (see step S887). If the faster decoder mode fails to correct errors, an attempt is then made S883 to correct errors using a slower decoder mode.

Furthermore, it is noted, with reference to step S871, that in the event that the value of the operational parameter indicates that a relatively "pessimistic" error correction strategy is preferable, that it is possible to skip step S865, and to attempt to correct errors (in step S863) using the slower decoder rather than the faster decoder.

Figure 7:
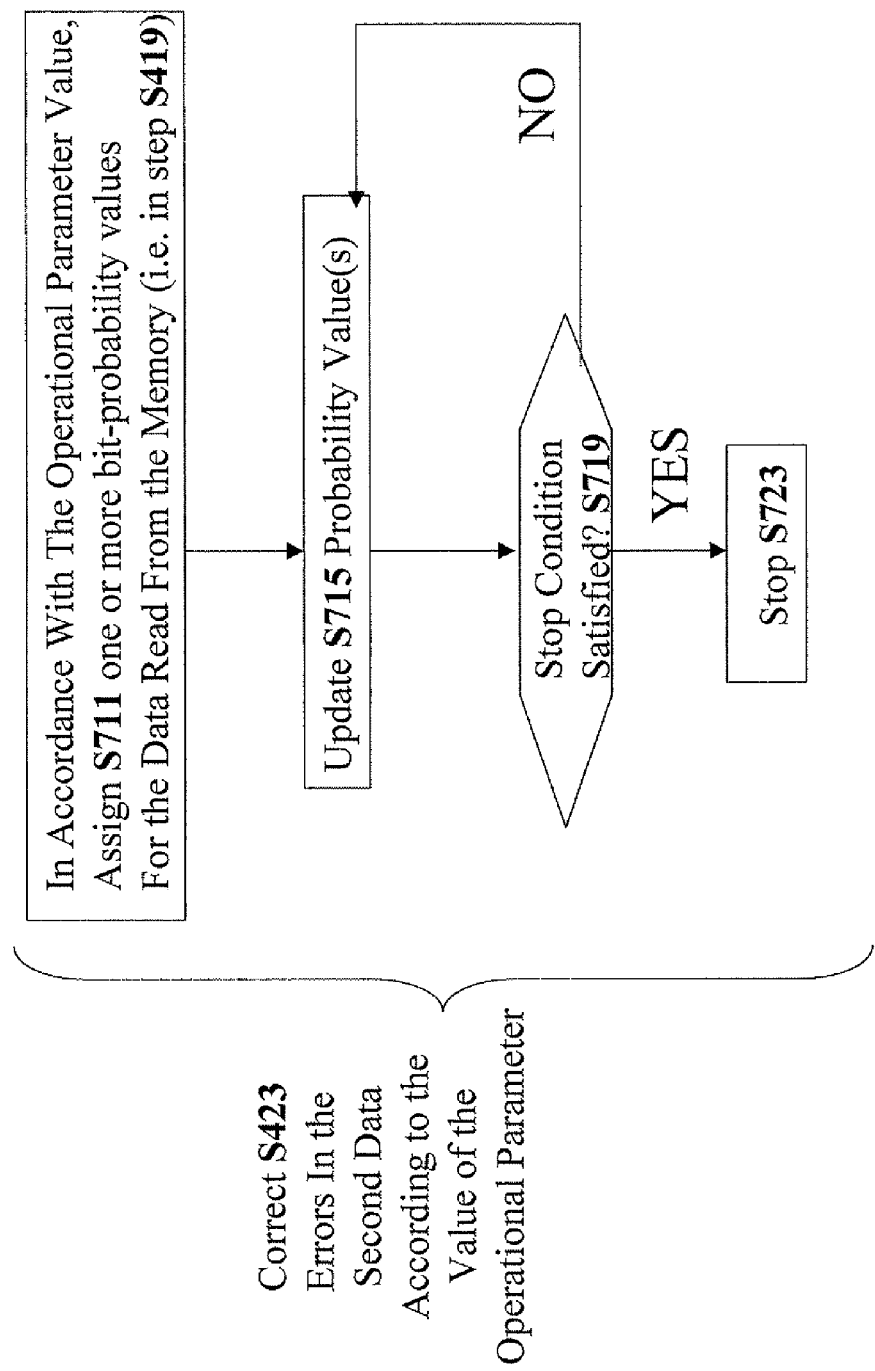
Figure 8:
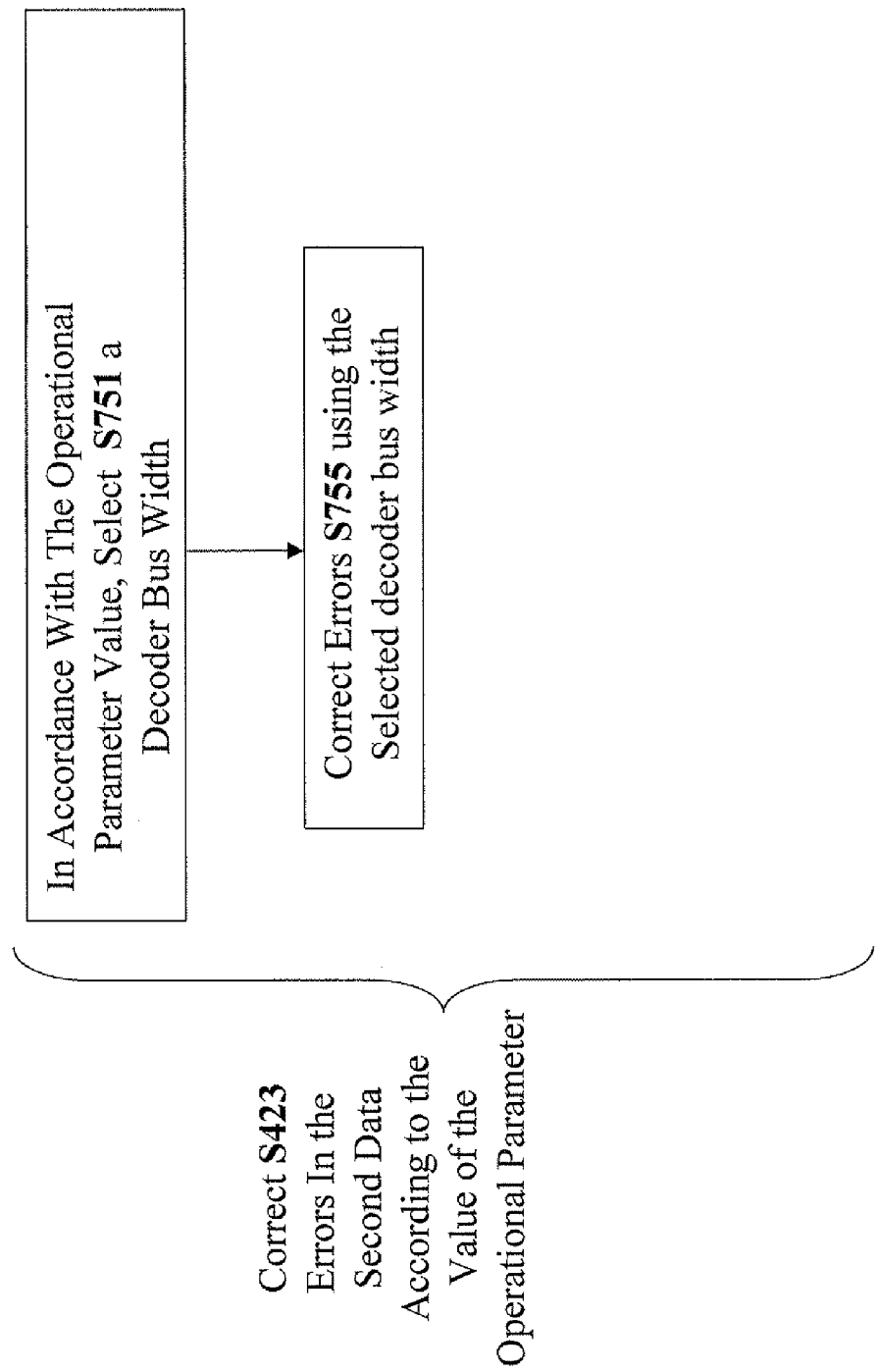

A Discussion of FIGS. 7-8

FIGS. 7-8 are flow charts of techniques for correcting errors in accordance with a value of the operational parameter using a soft decoder.

Soft decoders operate by assigning a probability to each bit of the codeword (e.g. the probability that the value of the bit is 1 and not 0), and running multiple iterations in each of which the probability of each bit is changed according to the current probabilities of other bits.

Any decoder that is not a soft decoder is herein called I"an algebraic decoder".

In step S711, one or more bit-probability values are assigned in accordance with the operational parameter determined in step S415.

For the present disclosure, a "bit-probability value" is defined as a probability that a specified bit has a specified value—for example, 0 or 1.

In one non-limiting example relating to systematic decoders, bits corresponding to the original data are read from the memory in step S419. In this example, one or more of the read-back bits may be flipped—for each bit, a respective probability that the bit is "flipped" is initially assigned. In the event that the probability that a given bit is "flipped" is initially assigned "higher" than necessary, the iterative probabilistic error correction routine may converge "unnecessarily slow" (i.e. in terms of computation steps or resources required and/or amount of time needed to converge). Conversely, in the event that the probability that a given bit is "flipped" is initially assigned "lower" than necessary, there is a risk that the error correction routine may not converge, or may converge to an incorrect result Thus, in one non-limiting use case, in the event that the "value of the operational parameter" indicates an "optimistic situation," it is possible to assign appropriate initial probability indicative of a lower probability of bit flipping—this could "help" the iterative probabilistic error correction routine converge faster. In the event that the value of the operational parameter" indicates an "pessimistic situation," it is possible to assign appropriate initial probability indicative of a higher probability of bit flipping.

In steps S715 and S719 the iterative routine is carried out, where the probabilities are updated (see step S715) until a "stop condition" is satisfied in step S719 (for example, until a determination is made that the "original" data was "correctly" recovered). In step S723, the routine stops.

Reference is now made to FIG. 8.

As noted above, soft decoders operate by assigning a probability to each bit of the codeword (e.g. the probability that the value of the bit is 1 and not 0), and running multiple iterations in each of which the probability of each bit is changed according to the current probabilities of other bits.

This type of calculation is said to employ "message passing" techniques, as each bit "passes messages" to its peers. A major design decision in implementing such decoders is the bus width of the message passing. Using a wide bus (for example 10 bits) assures that if the algorithm can cope with the errors, the algorithm will indeed converge to the correct data. But on the other hand, the power consumption of the decoder is high in such design. Using a narrow bus (for example 3 bits) provides much lower power consumption, but the decoder might fail to converge to the correct data in cases with relatively large number of errors (even if the same pattern of data and errors is correctly decoded in a corresponding wide bus decoder). The number of bits used for message passing has a major influence on the power consumption of the decoding process—the higher the number of bits, the higher the power consumption.

One of the reasons for this phenomenon is that the soft decoder's messages and channel inputs (soft values) are stored in a large-power-consuming RAM during the decoding operation. When for example we use 3 bits instead of 10 bits per message, 70% of the RAM can be shut down. Another source of power consumption saving is the processing units that process these passing messages. It is evident that performing computations on 3 bits instead of 10 bits requires smaller and less-power-consuming units.

It is possible to implement a soft decoder in which the number of bits in the "message passing" can be set at the beginning of the decoding. Thus, in some embodiments, a decoding bus width size is selected in accordance with the determined operational parameter value. In the event that the "value of the operational parameter" indicates an "optimistic situation," it is possible to select a smaller decoding bus width size and to correct errors accordingly. Otherwise, it may be preferable to select a larger decoding bus width size.

This is shown graphically in FIG. 8. In step S751, a decoder bus width is selected in accordance with the value of the operational parameter. In step S755, errors are corrected according to the selected value of the decoder bus width.

Figure 9B:
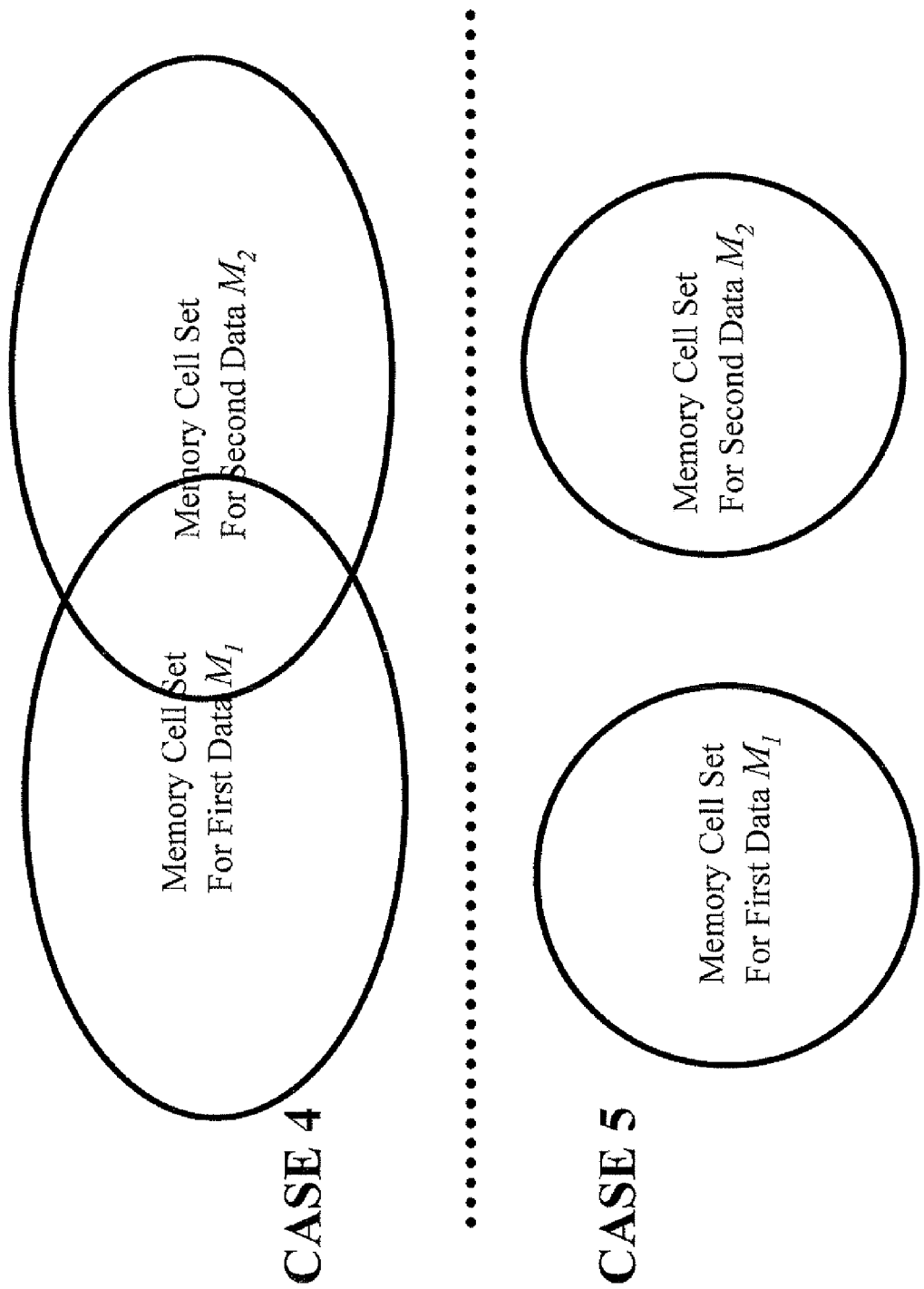

A Discussion of FIGS. 9A-9B

As noted earlier with reference to FIG. 3B, the situation where the "first data" and the "second data" are the same data is just one special case, and is described in FIG. 3A.

Nevertheless, FIG. 3B relates to the more general case where the first data and the second data either (i) are the same or (ii) are different.

Some embodiments relate to memories that include a plurality of memory cells—for example, flash memory cells, RAM cells or any other memory cells. It is noted that when data is stored on the memory, the data may reside in one or more memory cells. In some embodiments, the first data and the second data reside in the same set of memory cells (for example, because the first data and the second data are the same) where a "set of memory cells" refers to one or more memory cells. Alternatively, the first data resides in a first set of one or more memory cells, the second data resides in a second set of one or more memory cells, where the first set and the second of memory cells are distinct sets.

The different possibilities are illustrated in FIGS. 9A-9B where the "first memory cell set $M_1$" refers to the first set of one or more memory cells on which the first data resides, and the "second memory cell set $M_2$" refers to the second set of one or more memory cells on which the second data resides."

Referring to FIGS. 9A-9B, case 1 refers to the case where $M_1$ and $M_2$ are identical sets. Case 2 refers to the case where $M_1$ is a proper sub-set of $M_2$. Case 3 refers to the case where $M_2$ is a proper sub-set of $M_1$. Case 4 refers to the case where (i) $M_1$ and $M_2$ overlap (i.e. include at least one common memory cell) (ii) $M_1$ includes at least one memory cell that is not a member of $M_2$ and (iii) $M_2$ includes at least one memory cell that is not a member of $M_1$. Case 5 refers to the case where $M_1$ and $M_2$ are disjoint.

Figure 10A:
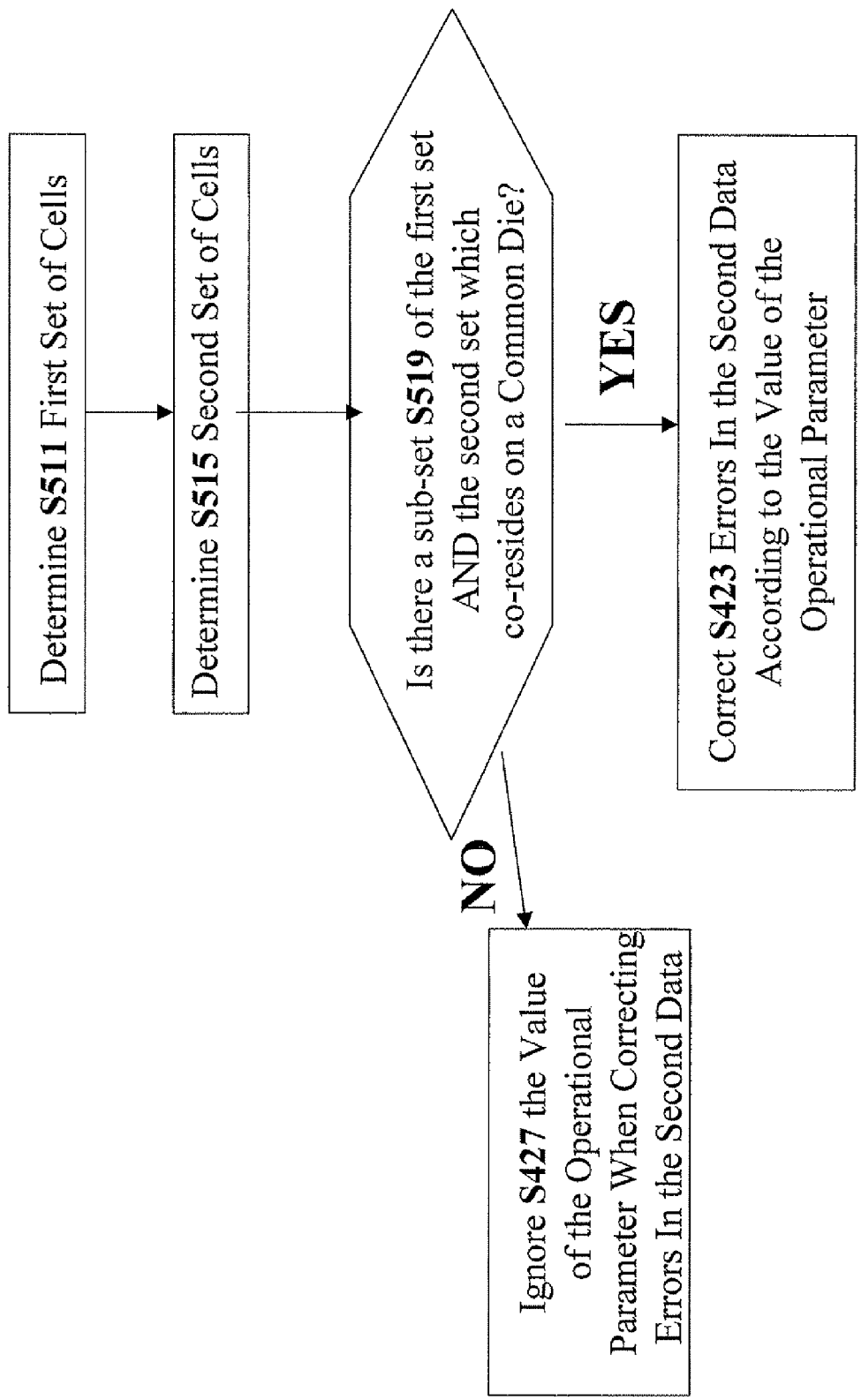
FIGS. 10A-10C are block diagrams of exemplary routines for correcting errors in accordance with a relationship between a first set of memory cells associated with the first data and a second set of memory cells associated with the second data.
Figure 10B:
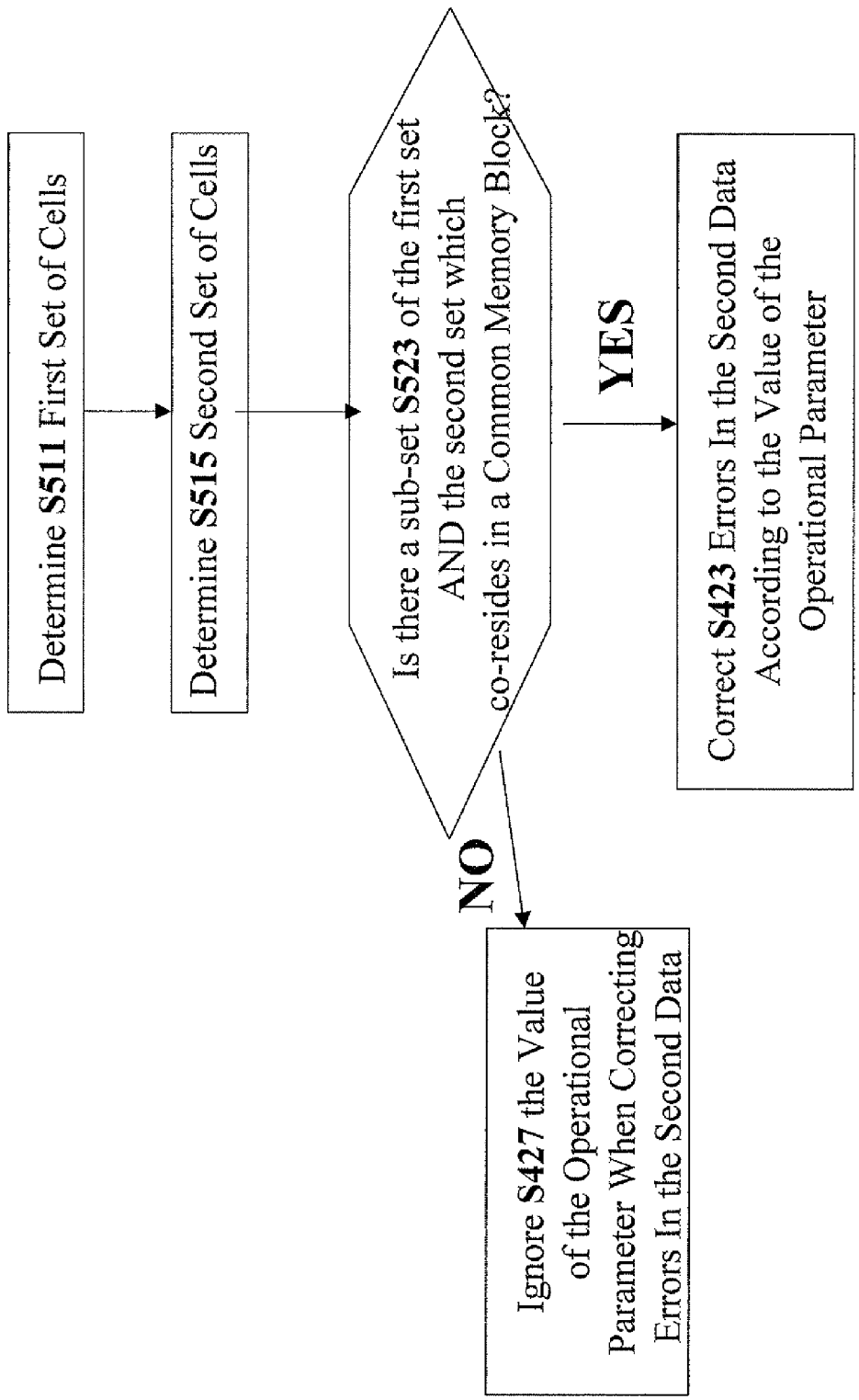
Figure 10C:
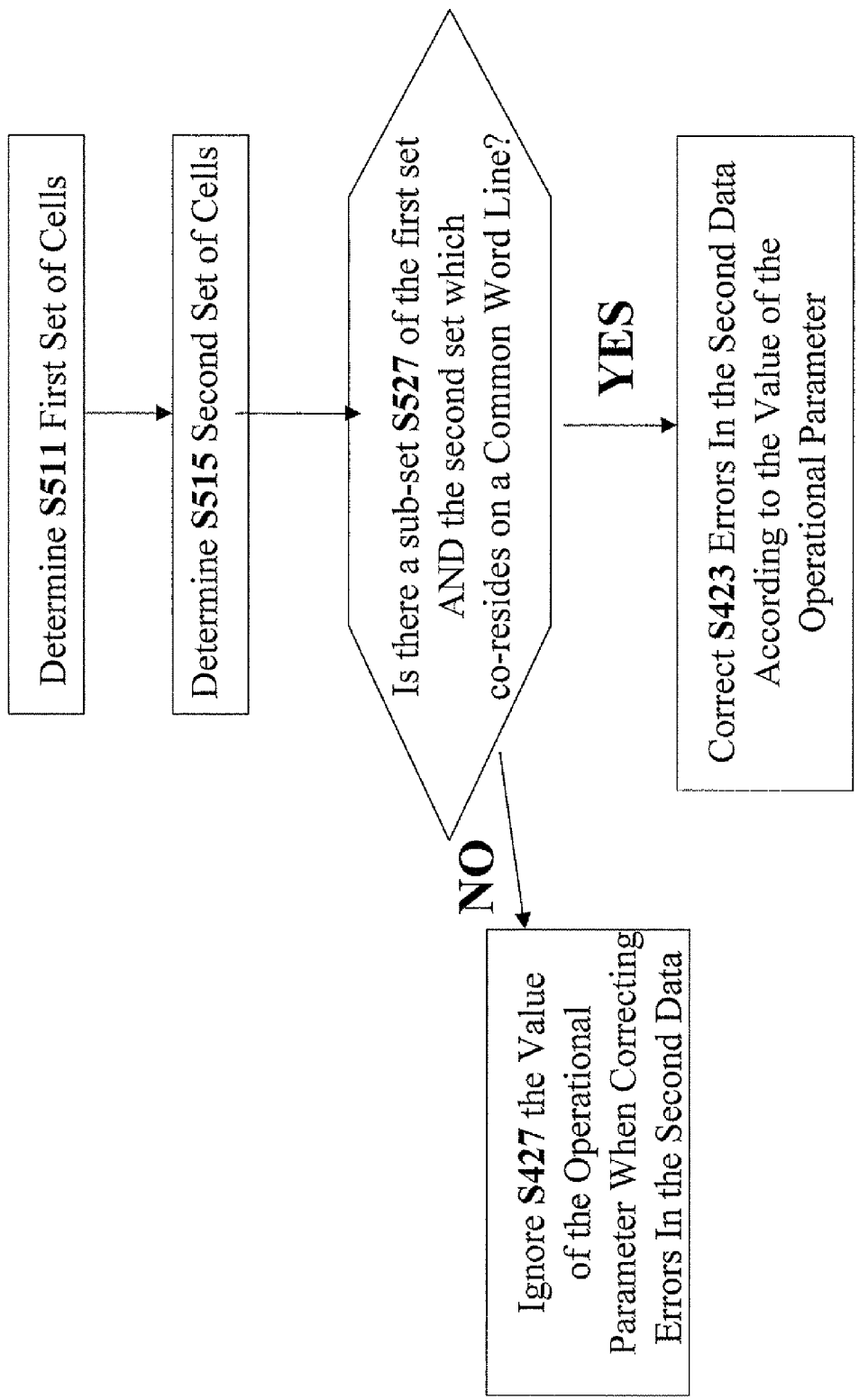

A Discussion of FIGS. 10A-10C

FIGS. 10A-10C provide flow charts for exemplary techniques for correcting errors in the second data according to some embodiments.

Reference is now made to FIG. 10A.

In steps S515 and S515, $M_1$ and $M_2$ are determined. In step S519, it is determined if there is a sub-set of $M_1$ and $M_2$ that co-resides on a common die (for example, a common flash die). In the event that there is no such sub-set (i.e. $M_1$ and $M_2$ are disjoint as in case 5 of FIG. 9B and reside on different dies), then it is possible to ignore S427 the operational parameter determined in step S415 (or to weigh the "influence" afforded to the operational parameter value to a lesser extent).

However, in the event that such a subset does, in fact exist, then the value of the operational parameter is used in step S423 (or used to a greater extent) when correcting errors in the second data.

Reference is now made to FIG. 10B.

In steps S515 and S515, $M_1$ and $M_2$ are determined. In step S523, it is determined if there is a sub-set of $M_1$ and $M_2$ that co-resides in a common memory block. In the event that there is no such sub-set (i.e. $M_1$ and $M_2$ are disjoint as in case 5 of FIG. 9B and reside on different memory blocks—for example, different flash blocks), then it is possible to ignore S427 the operational parameter determined in step S415 (or to weigh the "influence" afforded to the operational parameter value to a lesser extent).

However, in the event that such a subset does, in fact exist, then the value of the operational parameter is used in step S423 (or used to a greater extent) when correcting errors in the second data.

Reference is now made to FIG. 10C.

In steps S515 and S515, $M_1$ and $M_2$ are determined. In step S523, it is determined if there is a sub-set of $M_1$ and $M_2$ that co-resides on a common wordline. In the event that there is no such sub-set (i.e. $M_1$ and $M_2$ are disjoint as in case 5 of FIG. 9B and reside on different wordlines—for example, different flash wordlines), then it is possible to ignore S427 the operational parameter determined in step S415 (or to weigh the "influence" afforded to the operational parameter value to a lesser extent).

However, in the event that such a subset does, in fact exist, then the value of the operational parameter is used in step S423 (or used to a greater extent) when correcting errors in the second data.

Figure 11:
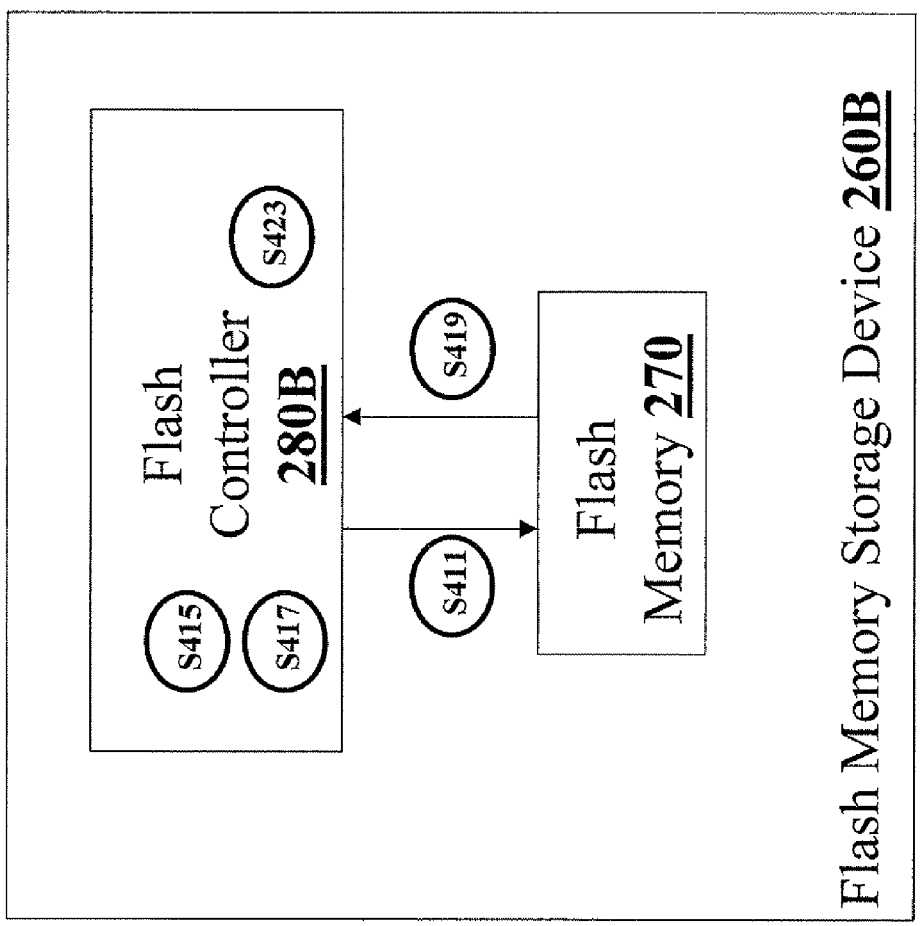
FIG. 11-13 are block diagrams of systems for handling error correction for a flash memory.

Discussion of FIG. 11

There is no limitation on the system architecture in which any presently-disclosed technique may be carried out. In some embodiments, any presently-disclosed technique may be carried out at least in part on a "single device" residing in a single device housing. Alternatively or additionally, any presently-disclosed technique may be carried out at least in part on an "external device" other than a device in which the memory resides. In one non-limiting example, any presently-disclosed technique may be carried out in a host device interfaced with a memory device (for example, a non-volatile memory device such as a flash memory device) via any device port or interface—for example, a USB interface, SD interface, MMC interface, NAND interface or any other interface.

Reference is now made to FIG. 11 which is a block diagram of a flash memory storage device 260B. Although FIG. 11 relates to the specific case of a flash memory device 260B, it is appreciated that this is not a limitation, and the presently-disclosed techniques are also applicable to memory devices that include memory other than flash memory 270—for example, volatile memory and/or magnetic memory. Although no device port is depicted in storage device 260B, it is appreciated that in some embodiments the storage device 260B includes a device port (for example, if storage device 260 is a peripheral storage device 260*), and in some embodiments the storage device 260B lacks a device port.

In the non-limiting example of FIG. 11, (i) step S411 is carried out by flash controller 280B which writes the first data to flash memory 270; (ii) steps S415 and S417 are carried out by the flash controller 280B; (iii) step S419 is carried out by flash controller 280B which reads the second data from flash memory 270; and (iv) step S423 is carried out by flash controller 280B which corrects errors in the second data read back from flash memory 270 in accordance with the determined value of the operational parameter.

There is no limitation on where the value of the operational parameter is saved in step S417, and the value of the operational parameter may be saved in any combination of volatile and/or non-volatile memory.

A brief discussion is now presented relating to non-limiting implementations where the flash controller 280 resides on a die that is different from the one or more dies of the flash memory 270. It is appreciated that this is non-limiting and that other implementations are contemplated.

Case A: One or more operational parameter values associated with one or more locations in flash memory (i.e. physical or logical location) are stored in the NAND flash die. After each flash programming operation, one or more operational parameter values are stored "internally" in a dedicated location in flash. To save space, the storage location may be shared by all pages in a block—each programming operation overwriting the previous result (i.e. operational parameter value) from writing a previous page in that block. This may assume that pages of the same block are correlated in their quality. In this implementation the controller reads S421 the value(s) of the operational parameter(s) when needed. The flash die provides a command that allows the controller to read the operational parameter(s) value(s) associated with a specific page (or block). The controller may do this reading S421 of the operational parameter(s) value(s) either before reading the second data S419 or after reading the data S419. The read operational parameter(s) value(s) is then used in the error correction process.

Case B: The information (i.e. the value(s) of one or more operational parameter) is stored in the controller rather than in the flash. In this implementation, the controller reads the value(s) of the one or more operational parameters using a command similar to the one mentioned above. In this case, the flash die does not have to provide extra storage area, except for a single register holding the information of the last programming operation. The controller 280 has the freedom to decide whether to store the quality information per each page or only per each block, trading-off storage space with better reliability of the information.

It is noted that any controller 280 (or 280B) disclosed herein (either a flash controller as illustrated in the figures or a controller for a memory device other than a flash memory device) may be implemented using any combination of hardware (for example, including a microprocessor and optionally volatile memory such as RAM or registers), firmware and/or software (for example, computer code which is stored in volatile and/or non-volatile memory and is executable by a microprocessor). Controller 280 (or 280B) may include any software and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in controller 280 or 280B including but not limited to reduced instruction set computer (RISC) architecture and/or complex instruction set computer (CISC) architecture.

Figure 12:
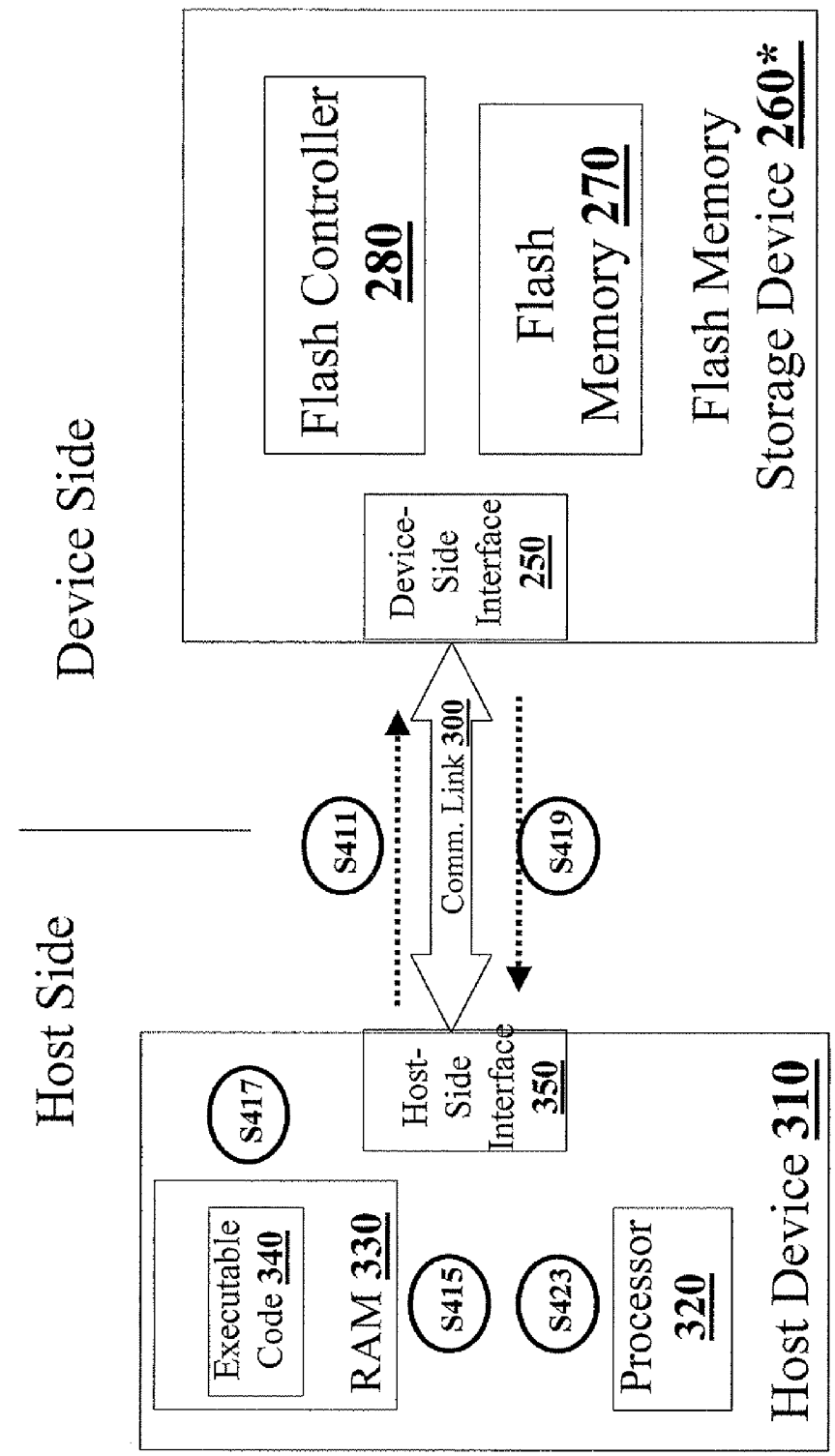

Discussion of FIG. 12

FIG. 12 is a block diagram of an exemplary system where the technique of FIG. 3B is carried out at least in part on the "host side." In the example of FIG. 12, the system includes host device 310 and flash memory storage device 260*.

Although a flash memory storage device 260* is depicted in FIG. 12, it is appreciated that the teachings may be applied to other memory devices other than flash memory devices.

In the non-limiting example of FIG. 12, (i) step S411 is carried out by the host 310 which writes the first data to flash memory 270 of flash memory device 260*(for example, by sending a request from host 310 to flash memory device 260 to write the first data); (ii) step S415 is carried out by host device 310 (which may, for example, send a "query" to flash device 260* requesting information related to the writing of the first data of step S411 after the first data writing); (iii) step S415 is carried out by host device 310 which may save the operational parameter(s) value(s) in any location on the host side and/or device side; (iv) step S419 is carried out by host device 310 which retrieves the operating parameter(s) value(s) from the flash device 260* or from any other volatile and/or non-volatile memory; (v) step S421 is carried out by host device 310 (for example, by sending a request from host 310 to flash memory device 260 to read the second data); and (vi) step S423 is carried out by host device 310.

In one non-limiting embodiment, one or more steps carried out by the host side are carried out by processor 320 executing executable code 340 (for example, "device driver code") residing in RAM 330.

Figure 13:
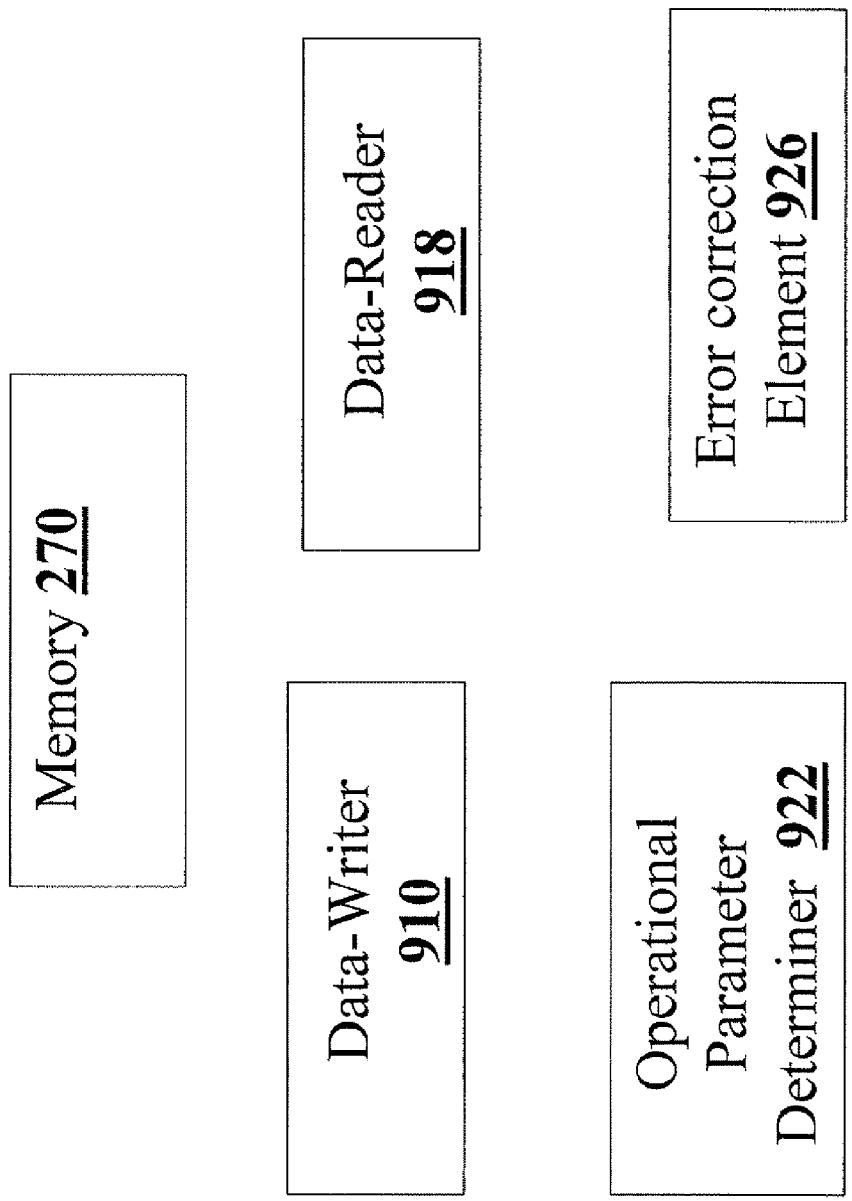

A Discussion of FIG. 13

As noted earlier, any step of FIG. 3B may be carried out at least in part on the host device and/or at least in part on the flash storage device 260.

FIG. 13 is a block diagram of a system for handling error correction for a memory (for example, flash memory 270). The system includes: a) a data-writer 910 (for example, a flash data-writer) operative to write first data to a memory (including but not limited to flash memory 270); b) an operational-parameter determiner 922 operative to determine a value of an operational parameter, the determined value being a consequence of the writing of the first data; c) a data-reader operative 918 (for example, a flash data-reader), subsequent to the writing and to the determining, to read second data from the memory (for example, including but not limited to flash memory 270); and d) an error correction element 926 operative to correct errors in the second data according to the determined operational parameter value that is a consequence of the writing of the first data.

It is noted that data-writer 910 and/or data-reader 918 and/or operational parameter determiner 922, and/or error correction element 926 may be implemented in any combination of hardware and/or software and/or firmware appropriately configured to perform the functionality described above. Furthermore, any element in FIG. 13 may reside at least in part on any device including but not limited to host device 310 and flash memory device 260.

In one non-limiting example, data-writer 910 may be either a controller 280 (which writes data to flash memory 270) and/or a host device 310 (for example, operative to send an appropriate 'write data' command to peripheral storage device 260* via communications link 300).

The operational parameter(s) may be determined at least in part on the device side and/or on the host side. Thus, in one non-limiting example, the operational-parameter determiner 922 may be any combination of controller 280 and/or host device 310 (for example, executing the appropriate device drivers).

In one non-limiting example, data-reader 910 may be either a controller 280 (which writes data to flash memory 270) and/or a host device 310 (for example, operative to send an appropriate 'read data' command to a peripheral storage device 260* via communications link 300).

In different embodiments, any system of FIGS. 11-13 is operative to carry out one or more routines described herein.

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method for handling error correction, the method comprising
    writing first data to a memory;
    measuring reliability of the writing of the first data;
    determining a value for an operational parameter based on the measured reliability of the writing;
    subsequent to the writing and to the determining, reading second data from the memory;
    selecting a decoder based on the value for the operational parameter associated with the measured reliability of the writing; and
    correcting errors in the second data utilizing the selected decoder.

2. The method of claim 1 wherein the memory is a flash memory.

3. The method of claim 1 wherein the first data are written to and the second data are read from a same set of one or more memory cells.

4. The method of claim 1 wherein:
    the first data are written to a first set of one or more memory cells;
    the second data are read from a second set of one or more memory cells the second set being different from the first set; and
    the correcting of errors of the second data being effected if at least one of a first set condition, a second set condition and a third set condition is true, and wherein the set conditions are defined as follows:
        according to the first set condition, a subset of the first set of memory cells and a subset of the second set of memory cells co-reside on a common die;
        according to the second set condition, a subset of the first set of memory cells and a subset of the second set of memory cells co-reside in a common memory cell block; and
        according to the third set condition, a subset of the first set of memory cells and a subset of the second set of memory cells co-reside on a common wordline.

5. The method of claim 1 wherein the value for the operational parameter is based on a number of bits left in incorrect state at an end of the writing of the first data.

6. The method of claim 1 wherein the correcting of errors in the second data includes selecting a decoding bus width size in accordance with the value for the operational parameter.

7. The method of claim 1 wherein the selecting the decoder includes at least one of:
    choosing one of a first decoder or a second decoder in accordance with the value for the operational parameter and correcting errors using the chosen decoder; and
    choosing one of a first mode of a decoder or a second mode of the decoder in accordance with the value for the operational parameter and correcting errors using the chosen mode of the decoder.

8. The method of claim 1 wherein the correcting of errors includes at least one of:
    deciding whether to attempt to correct errors using a lighter-weight decoder or to attempt to correct errors using a heavier-weight decoder that is heavier than the lighter-weight decoder;
    deciding whether to attempt to correct errors using a faster decoder or to attempt to correct errors using a slower decoder that is slower than the faster decoder;
    deciding whether to attempt to correct errors using a lighter-weight mode of a particular decoder or to attempt to correct errors using a heavier-weight mode of the particular decoder that is heavier than the lighter weight mode; and
    deciding whether to attempt to correct errors using a faster mode of a particular decoder or to attempt to correct errors using a slower mode of the particular decoder that is slower than the faster mode.

9. The method of claim 1 wherein the correcting of errors in the second data includes determining, in accordance with the value for the operational parameter, one or more bit-probability values for the second data.

10. The method of claim 1 wherein the value of the determined operational parameter is based on a number of programming iterations used in the writing of the first data.

11. The method of claim 1 wherein the value of the determined operational parameter is based on a time required for the writing of the first data.

12. The method of claim 1 wherein:
    the first data are written to a first set of one or more memory cells; and
    the second data are read from a second set of one or more memory cells, the second set being different from the first set.

13. The method of claim 12 wherein the method is carried out such that at least one of a first set condition, a second set condition, a third set condition, and a fourth set condition is true, and wherein the set conditions are defined as follows:
    according to the first set condition, the first set of one or more memory cells and the second set of one or more memory cells include at least one common memory cell;
    according to the second set condition, the first set of memory cells and the second set of memory cell sets are disjoint sets;
    according to the third set condition, the first set of memory cells is a subset of the second set of memory cells; and
    according to the fourth set condition, the second set of memory cells is a subset of the first set of memory cells.

14. A data storage device comprising:
    a memory; and
    a controller operative to:
        write first data to the memory;
        measure reliability of the write of the first data;
        determine a value for an operational parameter based on the measured reliability of the write;
        subsequent to the writing and to the determining, read second data from the memory;
        select a decoder based on the value for the operational parameter associated with the measured reliability of the write; and
        correct errors in the second data utilizing the selected decoder.

15. The device of claim 14 wherein the memory is a flash memory.

16. The device of claim 14 wherein the memory includes a plurality of memory cells and the controller is operative to write the first data and read the second data from the same set of one or more of the memory cells.

17. The device of claim 14 wherein the memory includes a plurality of memory cells and the controller is operative:
- to write the first data to a first set of one or more of the memory cells;
- to read the second data from a second set of one or more of the memory cells the second set being different from the first set; and
- to effect the correcting of the second data if at least one of a first set condition, a second set condition and a third set condition is true, and wherein the set conditions are defined as follows:
  - according to the first set condition, a subset of the first set of memory cells and a subset of the second set of memory cells co-reside on a common die;
  - according to the second set condition, a subset of the first set of memory cells and a subset of the second set of memory cells co-reside in a common memory cell block; and
  - according to the third set condition, a subset of the first set of memory cells and a subset of the second set of memory cells co-reside on a common wordline.

18. The device of claim 14 wherein the determined operational parameter value describes at least one of a number of bits left in incorrect state at the end of the writing of the first data; a number of programming iterations used in the writing of the first data; or a time required for the writing of the first data.

19. The device of claim 14 wherein the controller is operative such that the correcting of errors in the second data includes selecting a decoding bus width size in accordance with the value for the operational parameter.

20. The device of claim 14 wherein the controller is operative such that the selecting the decoder includes effecting at least one of:
- choosing one of a first decoder or a second decoder in accordance with the value for the operational parameter and correcting errors using the chosen decoder; and
- choosing one of a first mode of a decoder or a second mode of the decoder in accordance with the value for the operational parameter and correcting errors using the chosen mode of the decoder.

21. The device of claim 14 wherein the controller is operative such that the correcting of errors according to the determined operational parameter value includes at least one of:
- deciding whether to attempt to correct errors using a lighter-weight decoder or to attempt to correct errors using a heavier-weight decoder that is heavier than the lighter-weight decoder;
- deciding whether to attempt to correct errors using a faster decoder or to attempt to correct errors using a slower decoder that is slower than the faster decoder;
- deciding whether to attempt to correct errors using a lighter-weight mode of a particular decoder or to attempt to correct errors using a heavier-weight mode of the particular decoder that is heavier than the lighter weight mode; and
- deciding whether to attempt to correct errors using a faster mode of a particular decoder or to attempt to correct errors using a slower mode of the particular decoder that is slower than the faster mode.

22. The device of claim 14 wherein the controller is operative such that the correcting of errors includes determining, in accordance with the value for the operational parameter, one or more bit-probability values for the second data.

23. The device of claim 14 wherein the memory includes a plurality of memory cells and the controller is operative:
- to write the first data to a first set of one or more of the memory cells; and
- to read the second data from a second set of one or more of the memory cells, the second set being different from the first set.

24. The device of claim 23 wherein the controller is operative such that at least one of a first set condition, a second set condition, a third set condition, and a fourth set condition is true, and wherein the set conditions are defined as follows.
- according to the first set condition, the first set of one or more memory cells and the second set of one or more memory cells include at least one common memory cell;
- according to the second set condition, the first set of memory cells and the second set of memory cell sets are disjoint sets;
- according to the third set condition, the first set of memory cells is a subset of the second set of memory cells; and
- according to the fourth set condition, the second set of memory cells is a subset of the first set of memory cells.

25. A host device comprising:
a host-side storage;
a host-side processor;
a host-side interface for inter-device coupling with a memory device; and
driver code residing in the host-side storage, wherein execution of the driver code by the host-side processor is operative to:
write first data to the memory;
measure reliability of the write of the first data;
determine a value for an operational parameter based on the measured reliability of the write;
subsequent to the writing and to the determining, read second data from the memory;
select a decoder based on the value for the operational parameter associated with the measured reliability of the write; and
handle error correction of the second data utilizing the selected decoder.

26. The host device of claim 25 wherein the driver code is operative such that handling of error correction includes issuing a command, via the host-side interface, to handle the error correction of the second data according to the value for the operational parameter.

27. The host device of claim 25 wherein the driver code is operative such that the handling of error correction includes correcting errors, on the host side, in the second data according to the value for the operational parameter.

28. A computer program embedded in a non-transitory computer-readable storage medium, when executed by one or more processors for handling error correction for a memory, the computer program code being operable to:
write first data to the memory;
measure reliability of the write of the first data;
determine a value for an operational parameter based on the measured reliability of the write;
subsequent to the writing and to the determining, read second data from the memory;
select a decoder based on the value for the operational parameter associated with the measured reliability of the write; and
correct errors in the second data utilizing the selected decoder.

29. A controller for a memory, the memory including a plurality of memory cells, the controller comprising:
circuitry that is operative to:
write first data to the memory;
measure reliability of the write of the first data determine a value for an operational parameter based on the measured reliability of the write;

subsequent to the writing and to the determining, read second data from the memory;

select a decoder based on the value for the operational parameter associated with the measured reliability of the write; and correct errors in the second data utilizing the selected decoder.

* * * * *